United States Patent
Kurakata

(10) Patent No.: US 7,499,084 B2
(45) Date of Patent: Mar. 3, 2009

(54) IMAGE PICKUP APPARATUS, IMAGE DATA DISPLAY METHOD FOR THE SAME, PROGRAM FOR IMPLEMENTING THE METHOD, AND STORAGE MEDIUM STORING THE PROGRAM

(75) Inventor: Keihiro Kurakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 10/729,512

(22) Filed: Dec. 5, 2003

(65) Prior Publication Data

US 2004/0141084 A1    Jul. 22, 2004

(30) Foreign Application Priority Data

Dec. 11, 2002   (JP)   ............... 2002-359949

(51) Int. Cl.
 *H04N 5/76* (2006.01)
(52) U.S. Cl. ............... 348/231.2; 348/333.01
(58) Field of Classification Search ............ 348/333.01, 348/333.02, 333.05, 333.11, 153, 159, 211.11, 348/211.99, 211.8, 14.08, 143
See application file for complete search history.

(56) References Cited

U.S. PATENT DOCUMENTS

| | | | | |
|---|---|---|---|---|
| 5,850,352 | A * | 12/1998 | Moezzi et al. | 345/419 |
| 6,182,116 | B1 * | 1/2001 | Namma et al. | 709/204 |
| 6,204,877 | B1 * | 3/2001 | Kiyokawa | 348/211.3 |
| 6,208,379 | B1 * | 3/2001 | Oya et al. | 348/211.11 |
| 6,266,082 | B1 * | 7/2001 | Yonezawa et al. | 348/159 |
| 6,424,373 | B1 * | 7/2002 | Misue et al. | 348/211.99 |
| 6,476,858 | B1 * | 11/2002 | Ramirez Diaz et al. | 348/159 |
| 6,542,191 | B1 * | 4/2003 | Yonezawa | 348/333.01 |
| 6,580,458 | B2 * | 6/2003 | Inagaki | 348/333.02 |
| 6,583,813 | B1 * | 6/2003 | Enright et al. | 348/150 |
| 6,628,326 | B1 * | 9/2003 | Manico et al. | 348/211.12 |
| 6,774,935 | B1 * | 8/2004 | Morimoto et al. | 348/211.5 |
| 6,784,925 | B1 * | 8/2004 | Tomat et al. | 348/207.11 |
| 7,199,820 | B2 * | 4/2007 | Oka et al. | 348/211.3 |

FOREIGN PATENT DOCUMENTS

| | | |
|---|---|---|
| JP | 09-163292 | 6/1997 |
| JP | 10-177646 | 6/1998 |
| JP | H10-187932 | 7/1998 |
| JP | 2002-209163 | 7/2002 |

* cited by examiner

*Primary Examiner*—Nhan T. Tran
*Assistant Examiner*—Amy Hsu
(74) *Attorney, Agent, or Firm*—Cowan, Liebowitz & Latman, P.C.

(57) ABSTRACT

An image pickup apparatus comprising an image pickup device, a recording device, a display device, a communication device connectable to a plurality of image pickup apparatuses, an allotting device for allotting unique apparatus information to image data and a control device for controlling the display device to display image data received by the communication device and image data recorded by the recording device in different display configuration, with the unique apparatus information and specific information specifying the image data so that the image data received by the communication device and image data recorded by the recording device can be distinguished from one another.

17 Claims, 20 Drawing Sheets

600 CAMERA(0)

| | IMAGE NUMBER | DEVICE NUMBER | UNIQUE IMAGE NUMBER | FRAME COLOR |
|---|---|---|---|---|
| | 0001 | ID:0001 | 0001 | SKY BLUE |
| | 0002 | ID:0002 | 0001 | GREEN |
| | 0003 | ID:0002 | 0002 | GREEN |
| | 0004 | ID:0003 | 0001 | PURPLE |
| | 0005 | ID:0000 | 0005 | YELLOW |
| | 0006 | ID:0000 | 0006 | YELLOW |
| | 0007 | ID:0004 | 0002 | BLUE |
| | 0008 | ID:0004 | 0003 | BLUE |
| | 0009 | ID:0005 | 0005 | ORANGE |

| | USER NAME | DEVICE NUMBER | NO. OF IMAGES |
|---|---|---|---|
| ☑ 📷 | MY CAMERA | 0000 | 20 |
| ☐ 📷 | HANAKO YAMADA | 0001 | 1 |
| ☑ 📷 | TARO SATOH | 0002 | 2 |
| ☑ 📷 | KOICHI TANAKA | 0003 | 1 |
| ☐ 📷 | TAMAE MURAKAMI | 0004 | 5 |
| ☑ 📷 | JOHNSON | 0005 | 1 |

IMAGE PICKUP APPARATUS, IMAGE DATA DISPLAY METHOD FOR THE SAME, PROGRAM FOR IMPLEMENTING THE METHOD, AND STORAGE MEDIUM STORING THE PROGRAM

BACKGROUND OF THE INVENTION

1. Field of the Invention

The present invention relates to an image pickup apparatus, an image data display method for the same, a program for implementing the method, and a storage medium storing the program, and in particular to an image pickup apparatus that displays image data transferred (copied or moved) between image pickup apparatuses, an image data display method for the same, a program for implementing the method, and a storage medium storing the program.

2. Description of the Related Art

In recent years, many image pickup apparatuses equipped with communication sections have been proposed.

Conventional image pickup apparatuses, such as silver film cameras, cannot copy photographed image data on the spot, and therefore the photographed image data have to be developed and printed before being exchanged.

However, in the case of image pickup apparatuses such as digital cameras, it is possible to connect a plurality of imaging apparatuses together via communication sections and directly transfer, that is, copy, swap, or move digital image data of photographed images between the plurality of image pickup apparatuses.

For this reason, it has become common for digital image data to be copied between image pickup apparatuses.

A technology has been disclosed (see Japanese Laid-Open Patent Publication (Kokai) No. H10-187932) that, in the case where digital image data of an image photographed by an image pickup apparatus is transferred to a personal computer, edited, and then sent back to the image pickup apparatus, a mark ("process flag") showing that editing has been performed is added to digital image data so that during display it is possible to distinguish between original digital image data and the edited digital image data. However, copied digital image data copied from a digital image data of an image pickup apparatus is not distinguished from such the digital image data of the image pickup apparatus, so that the copied digital image data cannot be displayed distinguishably from the digital image data.

In this way, after a plurality of image pickup apparatuses have been interconnected via communication sections and digital image data has been copied between the image pickup apparatuses, when the digital image data is displayed on a particular image pickup apparatus, it is not possible for users to easily distinguish which digital image data was photographed with the particular image pickup apparatus and which digital image data was photographed by another image pickup apparatus and hence it is difficult for users to sort and view the digital image data.

SUMMARY OF THE INVENTION

It is an object of the present invention to provide an image pickup apparatus and an image data display method for the same that are capable of easily displaying in a distinguishable manner image data when the image data is photographed by a plurality of image pickup apparatuses, transferred (copied or moved) between the image pickup apparatuses and displayed by one image pickup apparatus, as well as a program for implementing the method and a storage medium storing the program.

To attain the above object, in a first aspect of the present invention, there is provided an image pickup apparatus comprising an image pickup device, a recording device that records image data photographed by the image pickup device, a display device that displays the image data recorded by the recording device, a communication device that is connectable to a plurality of image pickup apparatuses, for transmitting and receiving the recorded image data, an allotting device that allots unique apparatus information for identifying the image pickup apparatus to the photographed image data, and a control device that provides control to cause the display device to display the image data received by the communication device from respective ones of the plurality of image pickup apparatuses and the image data recorded by the recording device, using the unique apparatus information, in a manner such that the image data received by the communication device from respective ones of the plurality of image pickup apparatuses and the image data recorded by the recording device can be distinguished from one another.

Preferably, the control device provides control to cause the display device to display the image data received by the communication device from respective ones of the plurality of image pickup apparatuses and the image data recorded by the recording device, with frames of respective different colors added thereto.

Preferably, the control device provides control to cause the display device to display the image data received by the communication device from respective ones of the plurality of image pickup apparatuses and the image data recorded by the recording device, with icons different from each other added thereto.

Preferably, the control device provides control to cause the display device to display only selected image data out of the image data received by the communication device from respective ones of the plurality of image pickup apparatuses and the image data recorded by the recording device.

Preferably, the control device provides control to cause the display device to display only image data photographed by a same image pickup apparatus as selected image data out of the image data received by the communication device from respective ones of the plurality of image pickup apparatuses and the image data recorded by the recording device.

Preferably, the image pickup apparatus comprises an image number allotting device that allots an image number for identifying image data to the photographed image data.

More preferably, the control device is operable when image data is received by the communication device after the image number has been allotted to the photographed image data by the image number allotting device, to provide control to cause the image number allotting device to allot an image number different from the image number allotted to the photographed image data to the received image data and then record the received image data in the recording device.

More preferably, the control device is operable when a photographic operation is carried out to produce image data after the image number has been allotted to the image data received by the communication device by the image number allotting device, to provide control to cause the image number allotting device to allot an image number different from the image number allotted to the image data recorded by the recording device to the image data produced by the photographic operation and then record the photographed image data in the recording device.

More preferably, the control device provides control such that a new image number allotted to the received image data by the image number allotting device is incorporated as part of a file name of the received image data and the received image data is recorded in the recording device.

More preferably, the control device is operable when a same image number has been allotted to the received image data and the recorded image data, to provide control to compare at least one of respective photographed times, data sizes, and image data contents of the received image data and the recorded image data.

To attain the above object, in a second aspect of the present invention, there is provided a method of causing an image pickup apparatus to display image data, the image pickup apparatus including an image pickup device, a recording device that records image data photographed by the image pickup device, a display device that displays the image data recorded by the recording device, a communication device that is connectable to a plurality of image pickup apparatuses, for transmitting and receiving the recorded image data, the method comprising, an allotting step of allotting unique apparatus information for identifying the image pickup apparatus to the photographed image data, and a control step of providing control to cause the display device to display the image data received by the communication device from respective ones of the plurality of image pickup apparatuses and the image data recorded by the recording device, using the unique apparatus information, in a manner such that the image data received by the communication device from respective ones of the plurality of image pickup apparatuses and the image data recorded by the recording device can be distinguished from one another.

Preferably, the control step comprises providing control to cause the display device to display the image data received by the communication device from respective ones of the plurality of image pickup apparatuses and the image data recorded by the recording device, with frames of respective different colors added thereto.

Preferably, the control step comprises providing control to cause the display device to display the image data received by the communication device from respective ones of the plurality of image pickup apparatuses and the image data recorded by the recording device, with icons different from each other added thereto.

Preferably, the control step comprises providing control to cause the display device to display only selected image data out of the image data received by the communication device from respective ones of the plurality of image pickup apparatuses and the image data recorded by the recording device.

Preferably, the control step comprises providing control to cause the display device to display only image data photographed by a same image pickup apparatus as selected image data out of the image data received by the communication device from respective ones of the plurality of image pickup apparatuses and the image data recorded by the recording device.

Preferably, the method of displaying image data comprises an image number allotting step of allotting an image number for identifying image data to the photographed image data.

More preferably, when image data is received by the communication device after the image number has been allotted to the photographed image data in the image number allotting step, in the control step, control is provided to cause the image number allotting step to allot an image number different from the image number allotted to the photographed image data to the received image data and then record the received image data in the recording device.

More preferably, when a photographic operation is carried out to produce image data after the image number has been allotted to the image data received by the communication device in the image number allotting step, in the control step, control is provided to cause the image number allotting step to allot an image number different from the image number allotted to the image data recorded by the recording device to the image data produced by the photographic operation and then record the photographed image data in the recording device.

More preferably, the control step comprises providing control such that a new image number allotted to the received image data in the image number allotting step is incorporated as part of a file name of the received image data and the received image data is recorded in the recording device.

More preferably, when a same image number has been allotted to the received image data and the recorded image data, in the control step, control is provided to compare at least one of respective photographed times, data sizes, and image data contents of the received image data and the recorded image data.

To attain the above object, in a third aspect of the present invention, there is provided a computer-readable control program for causing a computer to implement a method of controlling an image pickup apparatus including an image pickup device, a recording device that records image data photographed by the image pickup device, a display device that displays the image data recorded by the recording device, a communication device that is connectable to a plurality of image pickup apparatuses, for transmitting and receiving the recorded image data, the program comprising, an allotting module for allotting unique apparatus information for identifying the image pickup apparatus to the photographed image data, and a control module for providing control to cause the display device to display the image data received by the communication device from respective ones of the plurality of image pickup apparatuses and the image data recorded by the recording device, using the unique apparatus information, in a manner such that the image data received by the communication device from respective ones of the plurality of image pickup apparatuses and the image data recorded by the recording device can be distinguished from one another.

To attain the above object, in a third aspect of the present invention, there is provided a storage medium storing a computer-readable control program for causing a computer to implement a method of controlling an image pickup apparatus including an image pickup device, a recording device that records image data photographed by the image pickup device, a display device that displays the image data recorded by the recording device, a communication device that is connectable to a plurality of image pickup apparatuses, for transmitting and receiving the recorded image data, the program comprising, an allotting module for allotting unique apparatus information for identifying the image pickup apparatus to the photographed image data, and a control module for providing control to cause the display device to display the image data received by the communication device from respective ones of the plurality of image pickup apparatuses and the image data recorded by the recording device, using the unique apparatus information, in a manner such that the image data received by the communication device from respective ones of the plurality of image pickup apparatuses and the image data recorded by the recording device can be distinguished from one another.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing preferred embodiments thereof.

Figure 1:
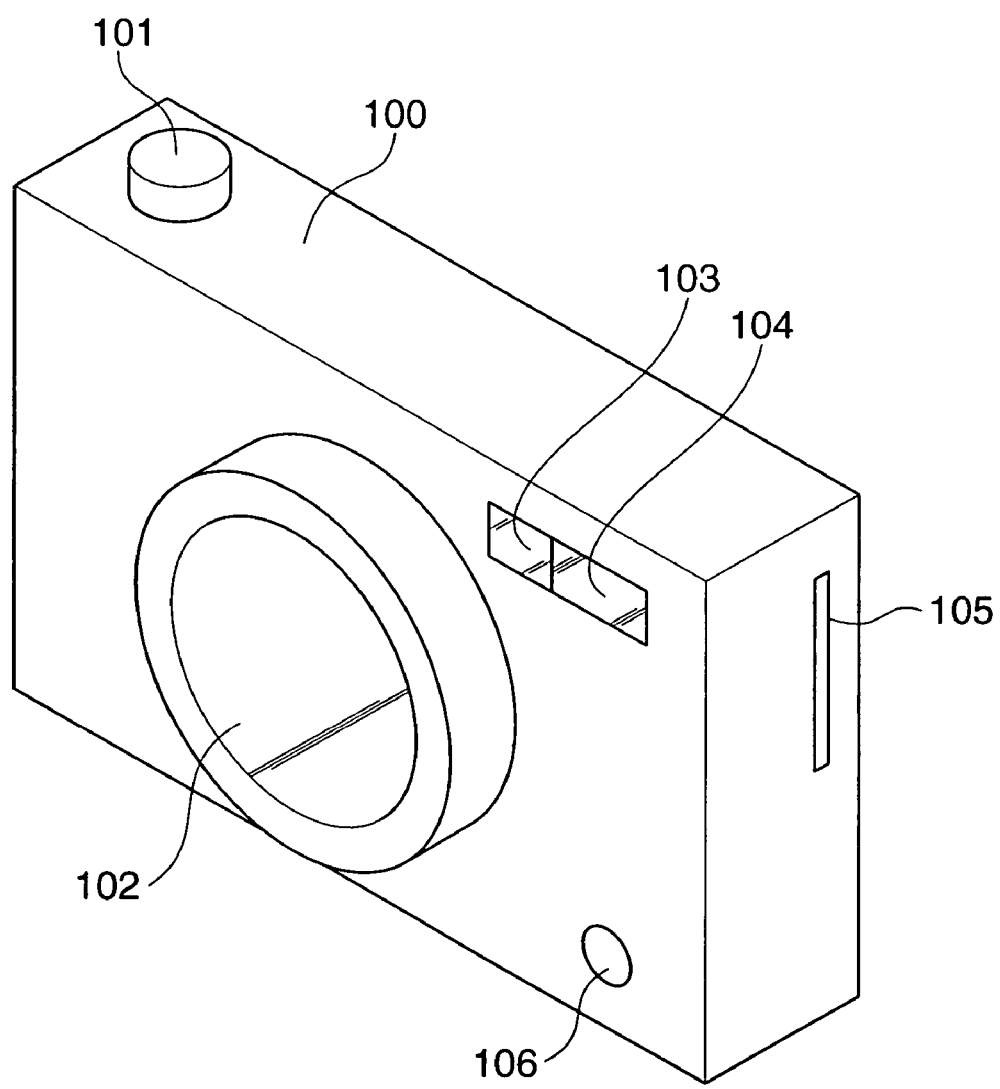
FIG. 1 is a perspective view showing the construction of an image pickup apparatus according to a first embodiment of the present invention as viewed from a front side thereof.
Figure 2:
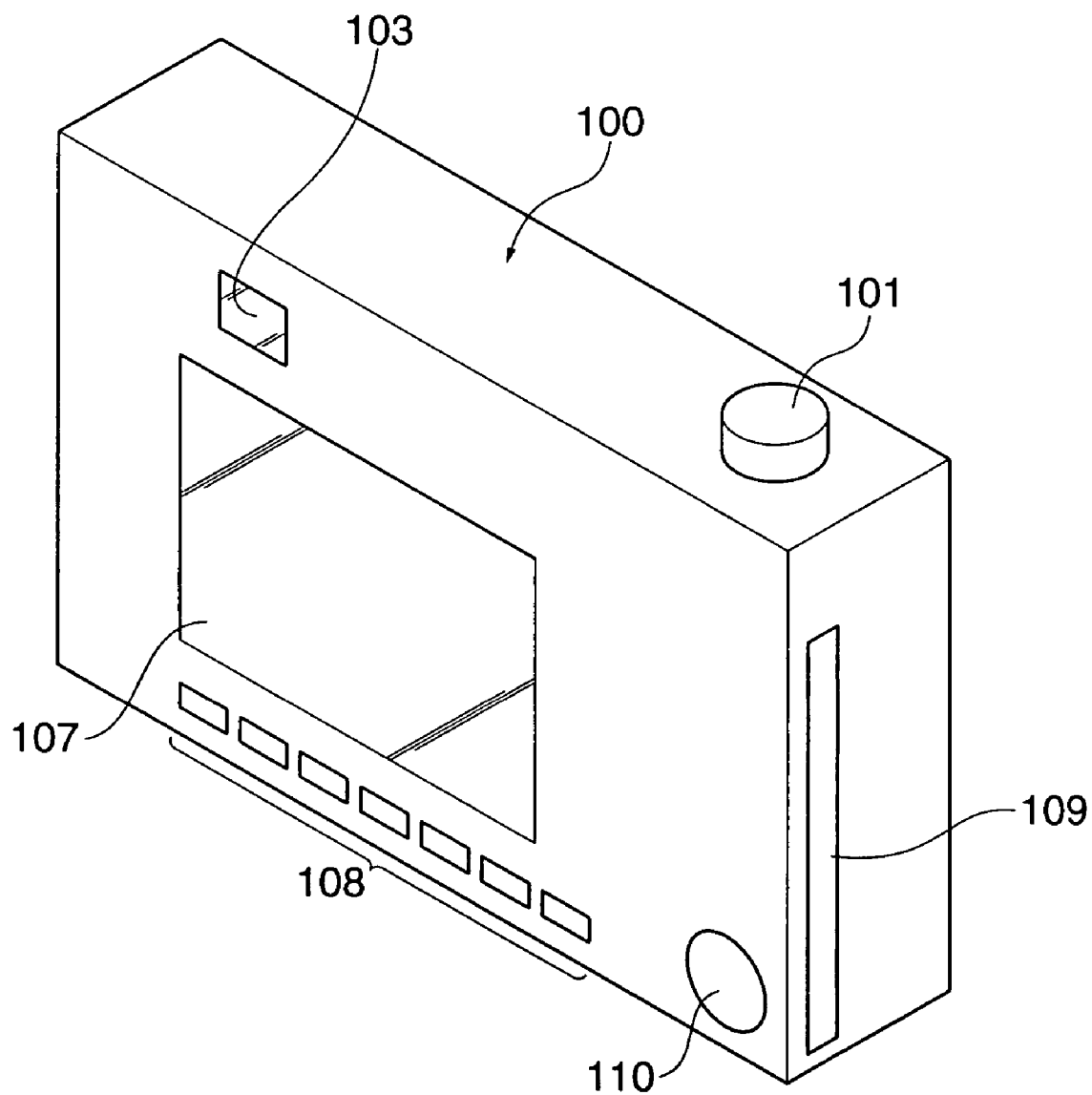
FIG. 2 is a perspective view of the image pickup apparatus of FIG. 1 as viewed from a rear side thereof.

FIG. 1 is a perspective view showing the construction of a digital camera as an image pickup apparatus according to a first embodiment of the present invention as viewed from a front side thereof, and FIG. 2 is a perspective view of the digital camera of FIG. 1 as viewed from a rear side thereof.

In FIGS. 1 and 2, reference numeral 100 designates a digital camera main body (image pickup apparatus main body), 101 a shutter button for photographic operations, 102 a lens barrel that includes lenses, 103 an optical finder for photographic operations, 104 a flash emitting section, 105 a communication connector, 106 an internal microphone for recording audio, 107 a display section implemented by a TFT liquid crystal display device or the like that displays various kinds of information and photographed digital image data, 108 various operating switches (an operating section), 109 a recording medium (recording section) that records photographed digital image data, and 110 an internal speaker for reproducing audio and operation sounds.

Figure 3:
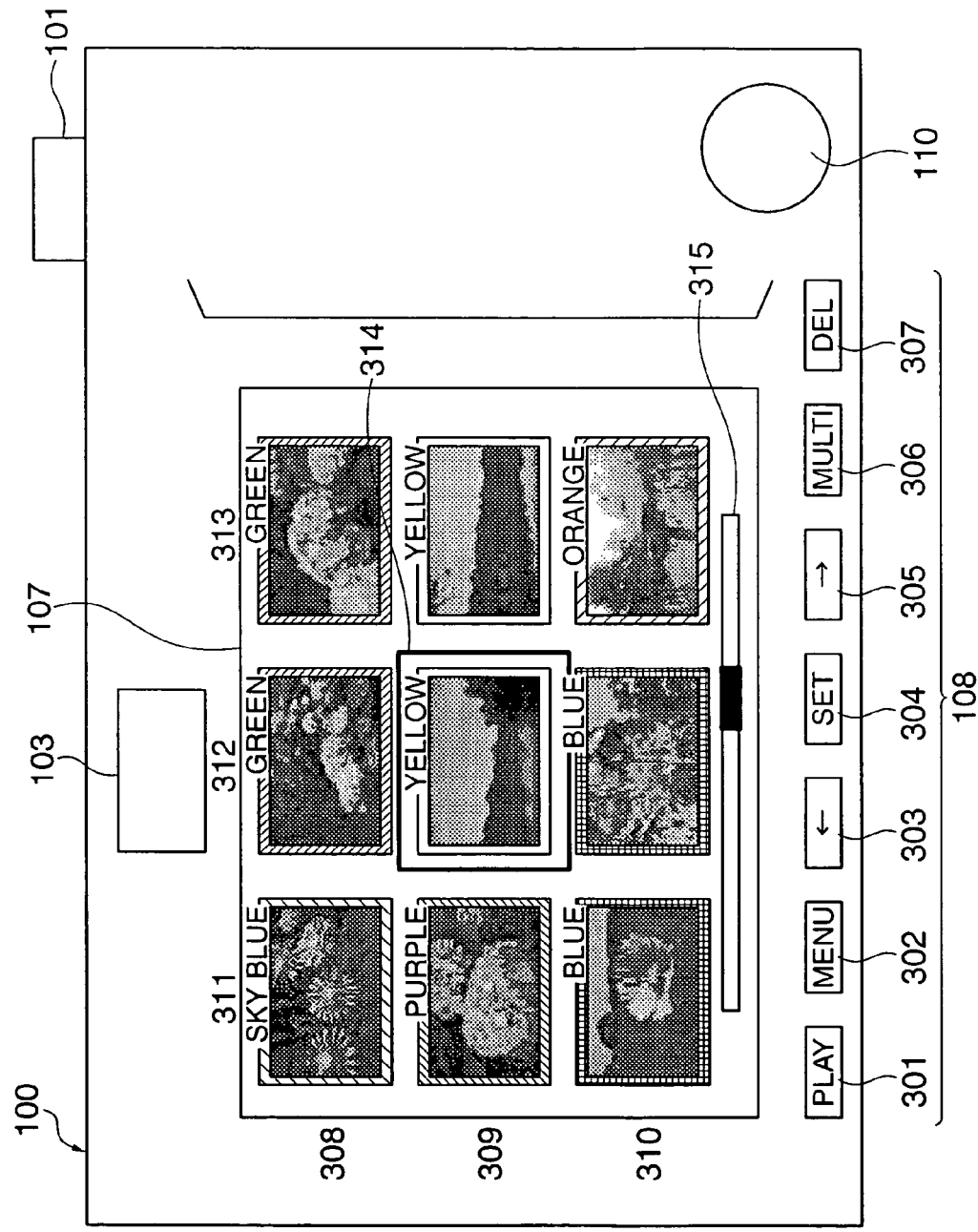
FIG. 3 is a view showing an example of display of digital image data by the image pickup apparatus of FIG. 1.

FIG. 3 is a view showing an example of display of digital image data by the image pickup apparatus of FIG. 1. FIG. 3 shows the digital camera 100 as viewed from the display section 107 side (the rear side).

In FIG. 3, the operating switches 108 include a reproduction operating button "PLAY" 301 for reproducing digital images, a menu operating button "MENU" 302 for displaying various kinds of information, a first operating button "←BACK" 303 that selects digital image data or selects a menu item, a second operating button "SET" 304 that determines a selection of digital image data or a menu item selection, a third operating button "→FORWARD" 305 that selects digital image data or selects a menu item, a fourth operating button "MULTI" 306 that performs a switching operation between display of digital image data of one image and display of digital image data of multiple images on the display section 107, and a fifth operating button "DEL" 307 that deletes designated digital image data.

In FIG. 3, digital image data of nine images is displayed on the display section 107, with reference numeral 308 designating a first display row in the row direction, reference numeral 309 designating a second display row, and reference numeral 310 designating a third display row. In the column direction, reference numeral 311 designates a first column, reference numeral 312 designates a second column, and reference numeral 313 designates a third column. The respective images are referred to using grid positions expressed in (row, column) format. That is, the upper left image is expressed as image (308,311), the lower right image is expressed as image (310,313), and the center image is expressed as image (309, 312).

Also, in FIG. 3, reference numeral 314 designates a cursor for selecting digital image data selection. Reference numeral 315 designates a scroll bar that indicates an approximate position of the digital image data presently being displayed within all of the digital image data recorded in the digital camera 100.

Figure 4:
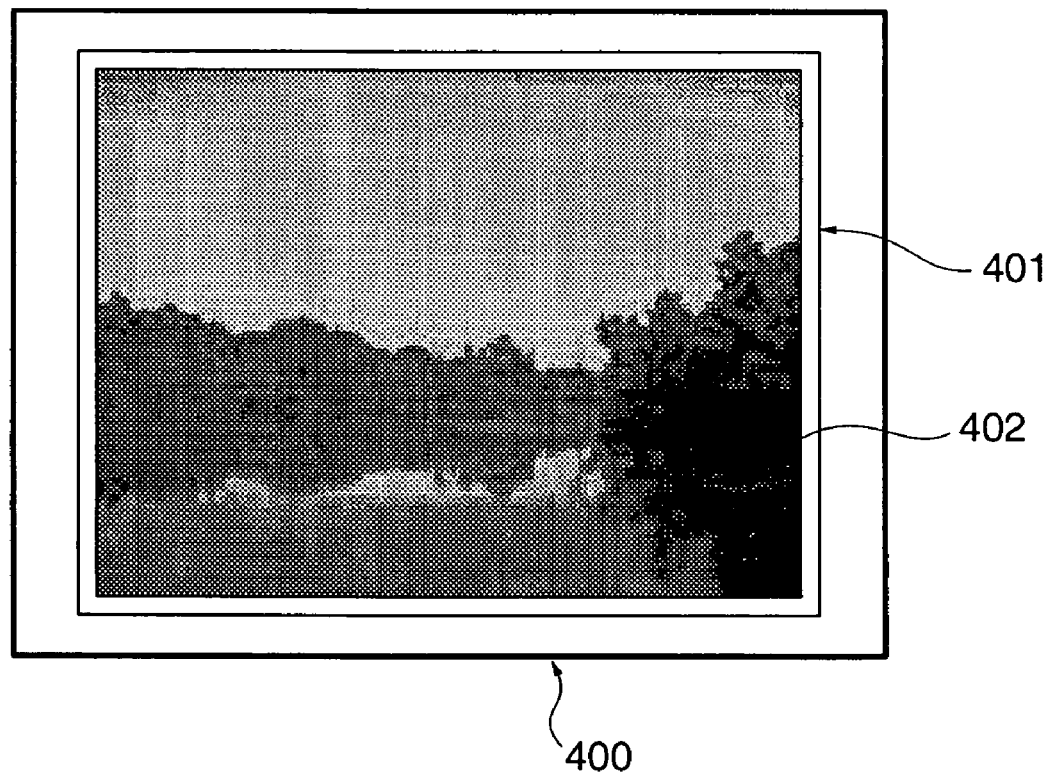
FIG. 4 is an enlarged view showing an image of the digital image data displayed in FIG. 3.

FIG. 4 is an enlarged view of image (309,312), out of the digital image data displayed by the display section 107 in FIG. 3. In FIG. 4, image (309,311), or a succeeding image, image (309,313), according to an operation of the first operating button 303 or the third operating button 305. Reference numeral 401 designates a color frame that identifies the digital camera that photographed the digital image data being displayed, and reference numeral 402 designates an image of the digital image data.

Figure 5:
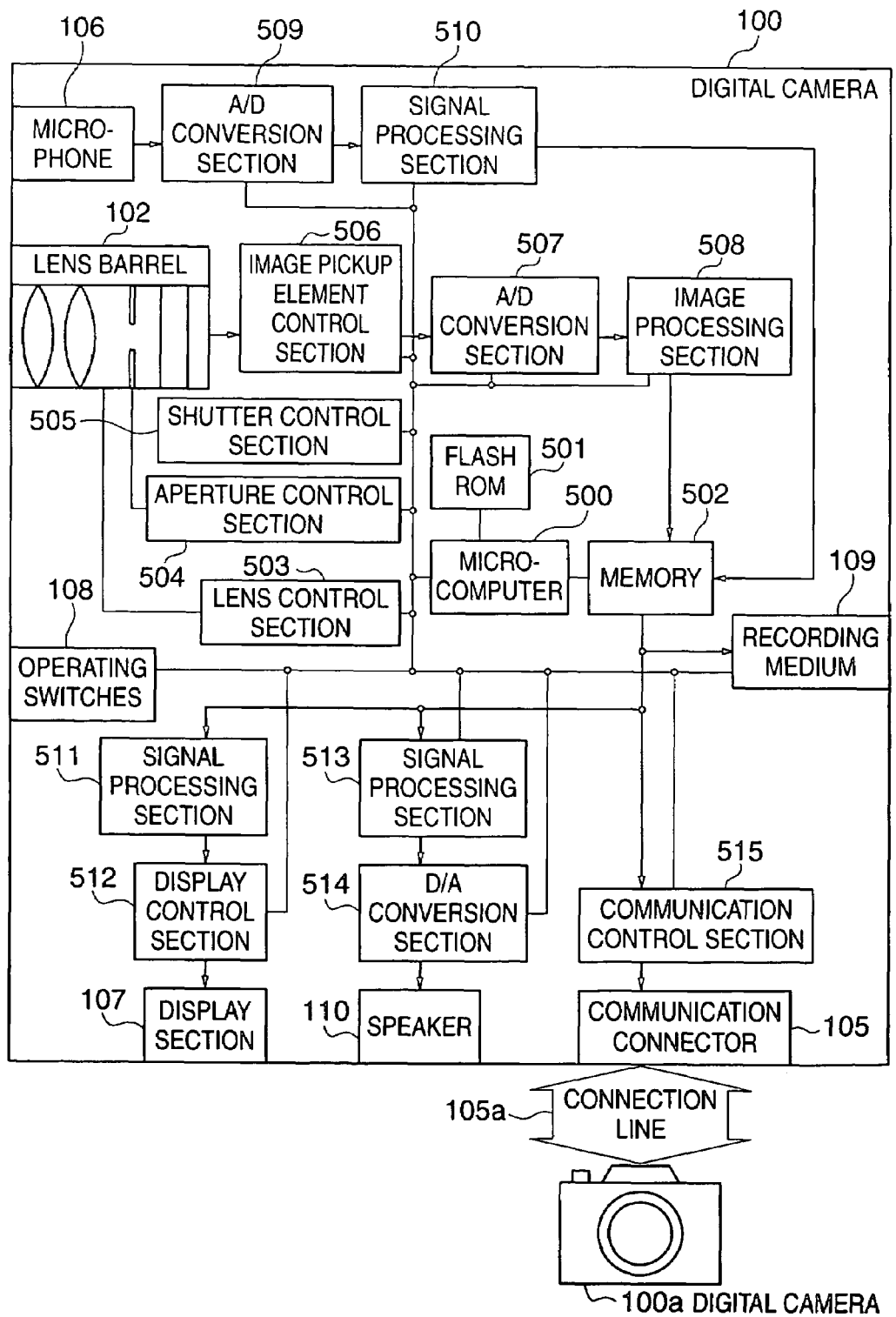
FIG. 5 is a block diagram showing the internal construction of the image pickup apparatus of FIG. 1.

FIG. 5 is a block diagram showing the internal construction of the digital camera 100.

In FIG. 5, reference numeral 100a designates another digital camera and reference numeral 105a designates a connection line to the digital camera 100a.

Also, reference numeral 500 designates a microcomputer (control section), 501 a flash ROM (read only memory), 502 a memory, 503 a lens control section, 504 an aperture control section, 505 a shutter control section, 506 an image pickup element control section, 507 a first (image) A/D conversion section, 508 an image processing section, 509 a second (audio) A/D conversion section, and 510 a first signal processing section. Reference numeral 511 designates a second signal processing section, 512 a display control section, 513 a third signal processing section, 514 a D/A conversion section, and 515 a communication control section.

In FIG. 5, various control programs stored in the flash ROM 501 are executed by the microcomputer 500.

When the microcomputer 500 executes a control program with a still image photography function that is stored in the flash ROM 501, if the shutter button 101 is pressed, image data is read from an image pickup element by the lens control section 503, the aperture control section 504, and the image pickup element control section 506, focus information and exposure information are calculated by the first A/D conversion section 507 and the image processing section 508, and the lens barrel 102 is operated to perform focusing (auto-focus) and set the exposure (auto exposure). Once preparations for photography have been completed in this way, exposure of the image pickup element is carried out by the aperture control section 504 and the shutter control section 505 using a predetermined exposure control value. Image data produced by the exposure of the image pickup element is read from the image pickup element by the image pickup element control section 506, the read analog data is converted into digital data by the first A/D conversion section 507, and digital image data is generated by the image processing section 508. This digital image data is temporarily stored in the memory 502 and is stored in the recording medium 109 thereafter.

According to settings made when a photographic operation is carried out, the digital image data stored in the memory 502 can be converted into display data by the second signal processing section 511 and displayed on the display section 107 by the display control section 512. The digital camera 100 is also able to photograph and reproduce moving images.

When the microcomputer 500 executes a control program with a moving image photography function stored in the flash ROM 501, if the shutter button 101 is pressed, image data is read from the image pickup element by the lens control section 503, the aperture control section 504, and the image pickup element control section 506, focus information and exposure information are calculated by the first (image) A/D conversion section 507 and the image processing section 508, the lens barrel 102 is operated to perform focusing (auto-focus) and set the exposure (auto exposure), and exposure of the image pickup element is carried out by the aperture control section 504 and the shutter control section 505 using a predetermined exposure control value. The image data produced by the exposure of the image pickup element is read from the image pickup element by the image pickup element control section 506, the read analog data is converted into digital data by the first (image) A/D conversion section 507, and digital image data is generated by the image processing section 508. This digital image data is temporarily stored in the memory 502 and is stored in the recording medium 109 thereafter as moving image data.

Audio data that is inputted from the internal microphone 106 in synchronization with the photographing of images is converted from analog data to digital data by the second (audio) A/D conversion section 509, and after a filtering process has been carried out by the first signal processing section 510, the digital data is temporarily stored in the memory 502. The audio data stored in the memory 502 is stored in the recording medium 109 together with the moving image data. While the shutter button 101 is depressed, images are sequentially read in synchronization with predetermined timing (frame rate) to photograph moving images.

When moving images are being photographed, focus information and exposure information are calculated from the photographed image data, and the lens barrel 102 is moved to continuously perform focusing (auto-focus) and set the exposure (auto exposure).

When the microcomputer 500 executes a control program with a moving image reproduction function stored in the flash ROM 501, if the operating switches 108 are selectively operated, moving image data recorded in the recording medium 109 is temporarily written in the memory 502 and the image data is converted into display data by the second signal processing section 511 in synchronization with predetermined timing (frame rate) and is displayed on the display section 107 by the display control section 512.

Audio data is subjected to signal processing for reproduction by the third signal processing section 513 in synchronization with the image data, is converted into an analog signal by the D/A conversion section 514 and is reproduced by the internal speaker 110.

Also, when the microcomputer 500 executes a control program with a communication function stored in the flash ROM 501, the communication control section 515 performs communication with the other digital camera 100a via the communication connector 105 and connection line 105a, to transfer and copy image data.

Next, a management method for digital image data photographed by a plurality of digital cameras will be described with reference to FIGS. 6A to 6E and FIG. 7.

FIGS. 6A to 6E are diagrams showing the management method for digital image data photographed by a plurality of digital cameras according to the present embodiment. In FIGS. 6A to 6E, a digital camera (1) 601, a digital camera (2) 602, a digital camera (3) 603, a digital camera (4) 604, and a digital camera (6) 605 store respective device numbers unique thereto. The digital cameras (1) 601 to (5) 605 correspond to the digital camera 100 of FIG. 1.

When photography is performed by the respective digital cameras (1) 601 to (5) 605 according to the photographic operation described above and digital image data is recorded in the respective recording media 109, image numbers that are uniquely issued by respective the digital cameras are allotted to images so that digital images can be identified and managed using such image numbers. Device numbers and the image numbers (unique image numbers) that are issued separately by the digital cameras are allotted to digital image data from the respective digital cameras, and are stored in the respective recording media 109.

Figure 6A:
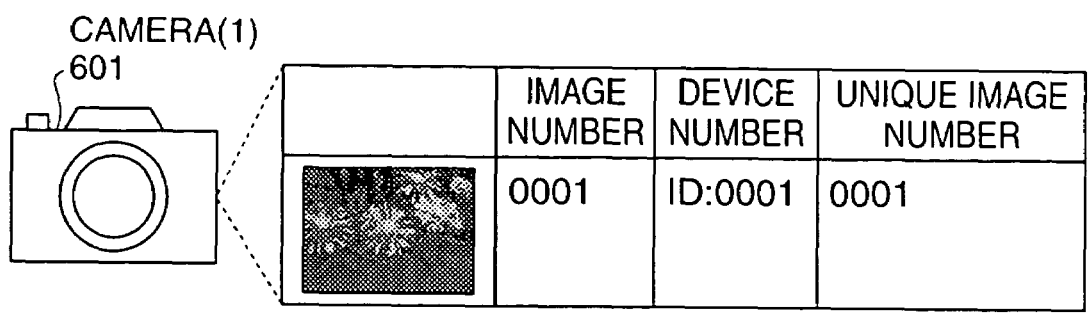
FIGS. 6A to 6E are diagrams collectively showing a digital image data management method for digital image data photographed by a plurality of image pickup apparatuses according to the first embodiment.
Figure 6B:
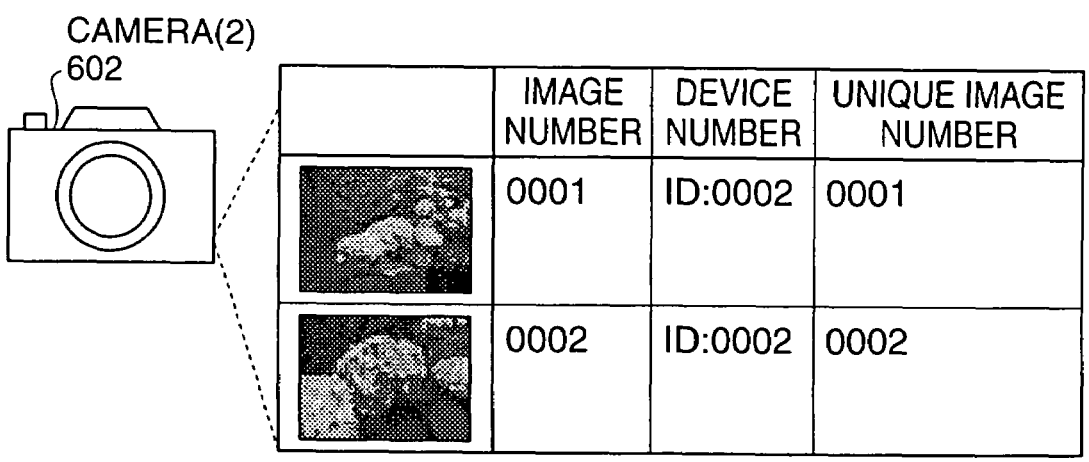
Figure 6C:
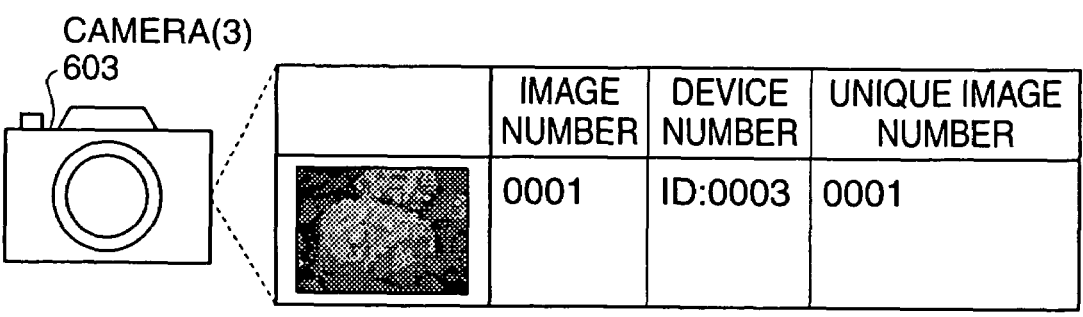
Figure 6D:
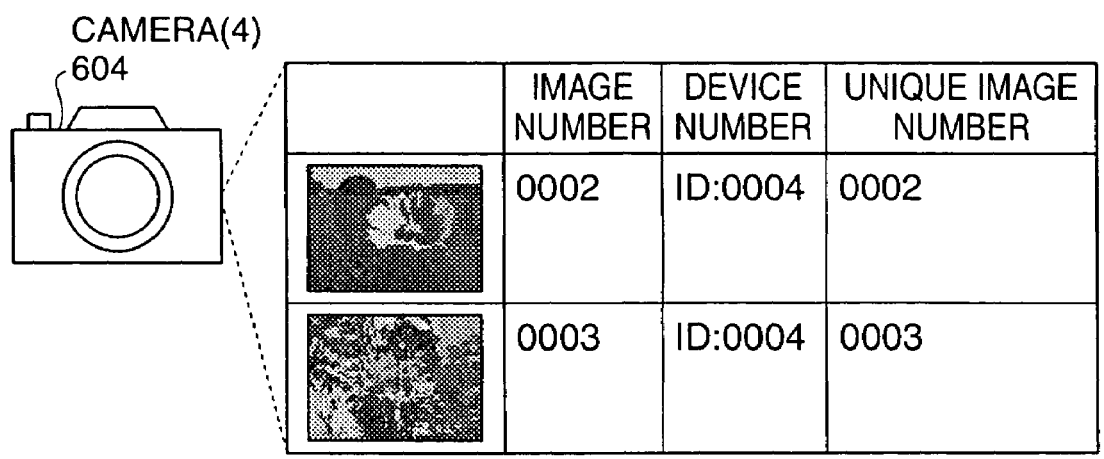
Figure 6E:
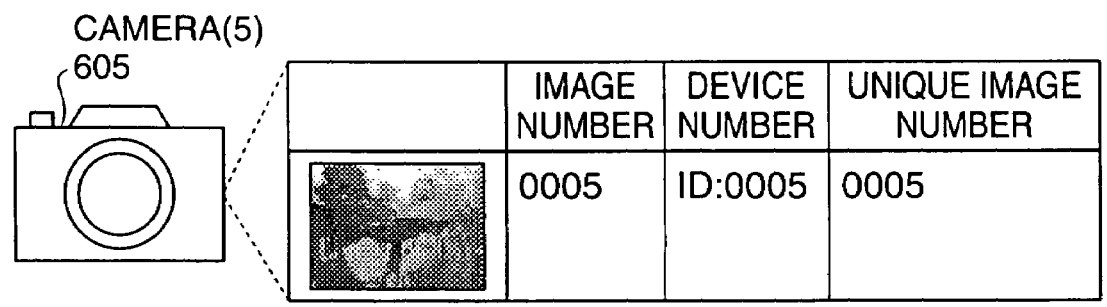
Figure 7:
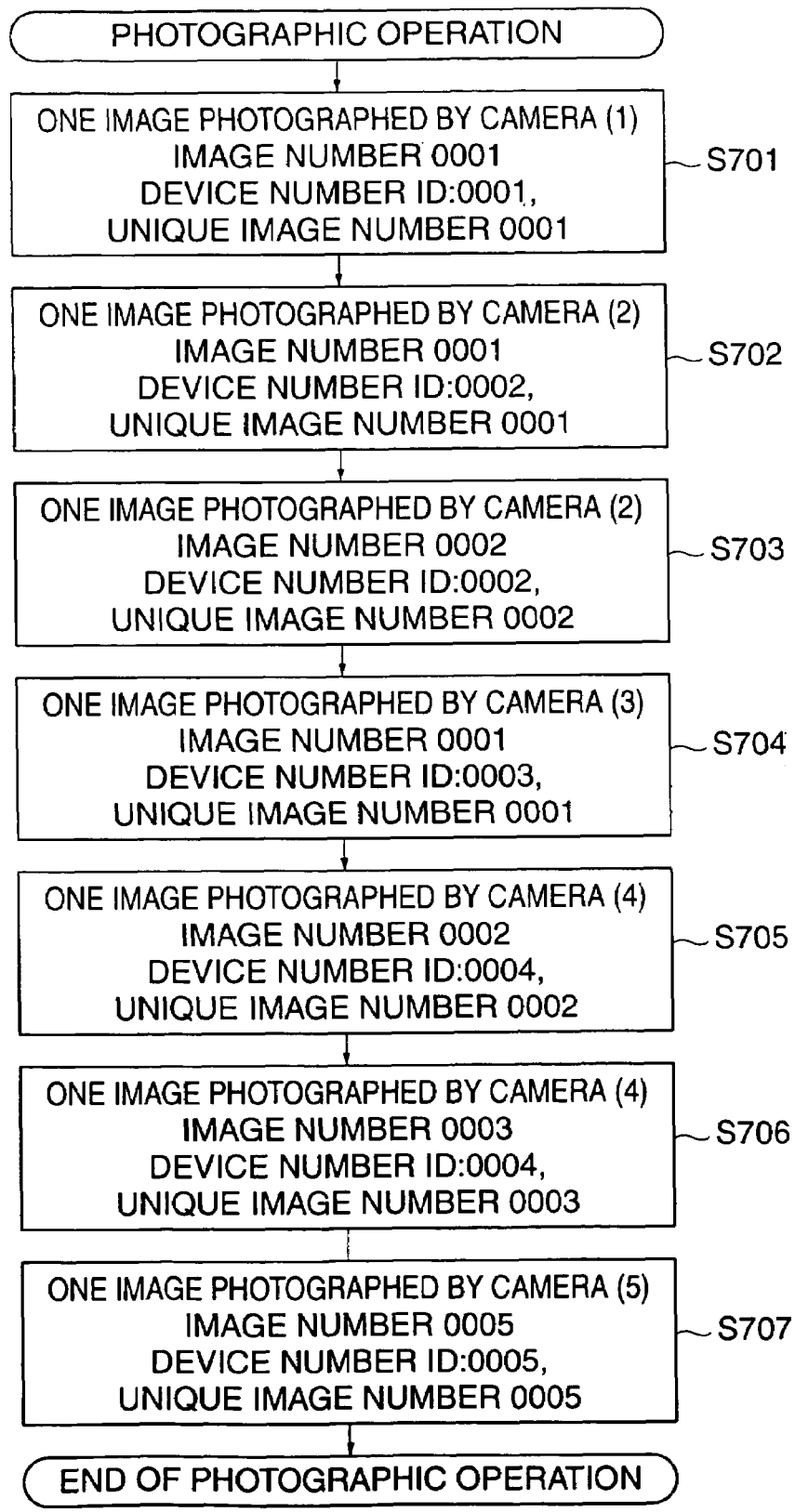
FIG. 7 is a flowchart showing a flow of photographic operations carried out by a plurality of image pickup apparatuses according to the first embodiment.

FIG. 7 is a flowchart showing a flow of photographic operations carried out by the plurality of the digital cameras (1) 601 to (5) 605 shown in FIGS. 6A to 6E.

In FIG. 7, when a photographic operation that takes a single frame photograph is carried out by the digital camera (1) 601, an image number 0001 that indicates a first image of the digital camera (1) 601 is issued as shown in FIG. 6A, the digital image data of the first image is managed as the image number 0001, and a device number ID:0001 and a unique image number 0001 are written into the digital image data (step S701).

When a photographic operation that takes a single frame photograph is carried out by the digital camera (2) 602, a image number 0001 that indicates a first image of the digital camera (2) 602 is issued as shown in FIG. 6B, the digital image data of the first image is managed as the image number 0001, and a device number ID:0002 and a unique image number 0001 are written into the digital image data (step S702). Next, when another photographic operation that takes a single frame photograph is carried out by the digital camera (2) 602, an image number 0002 that indicates a second image of the digital camera (2) 602 is issued, the digital image data of the second image is managed as the image number 0002, and a device number ID:0002 and a unique image number 0002 are written into the digital image data (step S703).

Next, a photographic operation that takes a single frame photograph is carried out by the digital camera (3) 603, an image number 0001 that indicates a first image of the digital camera (3) 603 is issued as shown in FIG. 6C, the digital image data of the first image is managed as the image number 0001, and a device number ID:0003 and a unique image number 0001 are written into the digital image data (step S704).

When a photographic operation that takes a single frame photograph is carried out by the digital camera (4) 604 in the case where an image number 0001 that indicates a first image of the digital camera (4) 604 already has been issued, as shown in FIG. 6D, an image number 0002 that indicates a second image of the digital camera (4) 604 is issued, the digital image data of the second image is managed as the image number 0002, and a device number ID:0004 and a unique image number 0002 are written into the digital image data (step S705). Next, when another photographic operation that takes a single frame photograph is carried out by the digital camera (4) 604, an image number 0003 that indicates a third image of the digital camera (4) 604 is issued, the digital image data of the third image is managed as the image number 0003, and the device number ID:0004 and a unique image number 0003 are written into the digital image data (step S706).

Next, when a photographic operation that takes a single frame photograph is carried out by the digital camera (5) 605 in the case where image numbers 0001 to 0004 that indicate first to fourth images of the digital camera (4) 604 already have been issued, as shown in FIG. 6E, an image number 0005 that indicates a fifth image of the digital camera (4) 604 is issued, the digital image data of the fifth image is managed as the image number "0005", and a device number "ID:0005" and a unique image number "0005" are written into the digital image data (step S707). After this, the present process is terminated.

Next, the procedure of processing when a copy operation for digital image data of one image is carried out between the plurality of digital cameras (1) 601 to (5) 605 according to the present embodiment, for example, between any two digital cameras, out of the digital cameras (1) 601 to (5) 605, will be described with reference to FIGS. 6A to 6E and FIG. 8. As shown in FIG. 9, described later, the digital cameras (1) 601 to (5) 605 are assumed to be connected to one another via the respective communication connectors 105.

Figure 8:
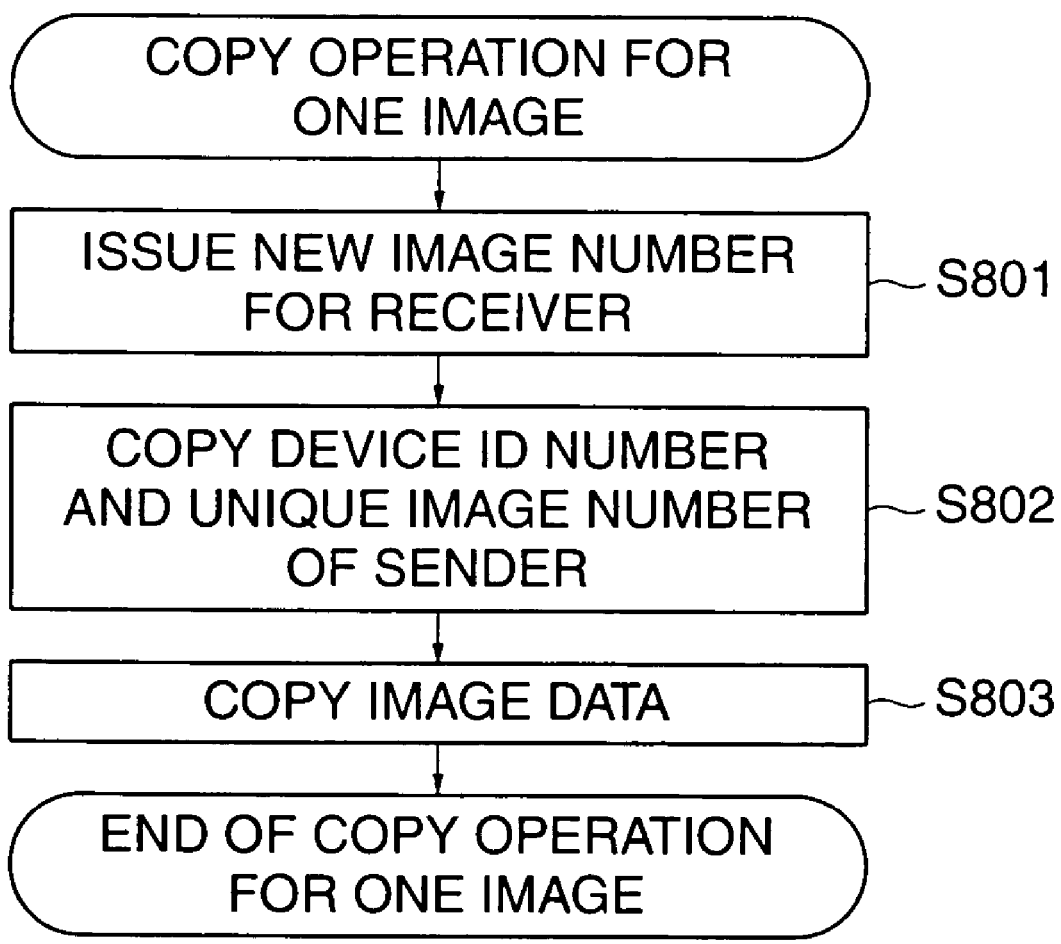
FIG. 8 is a flowchart showing the procedure of processing when a copy operation for image data of one image.
Figure 9:
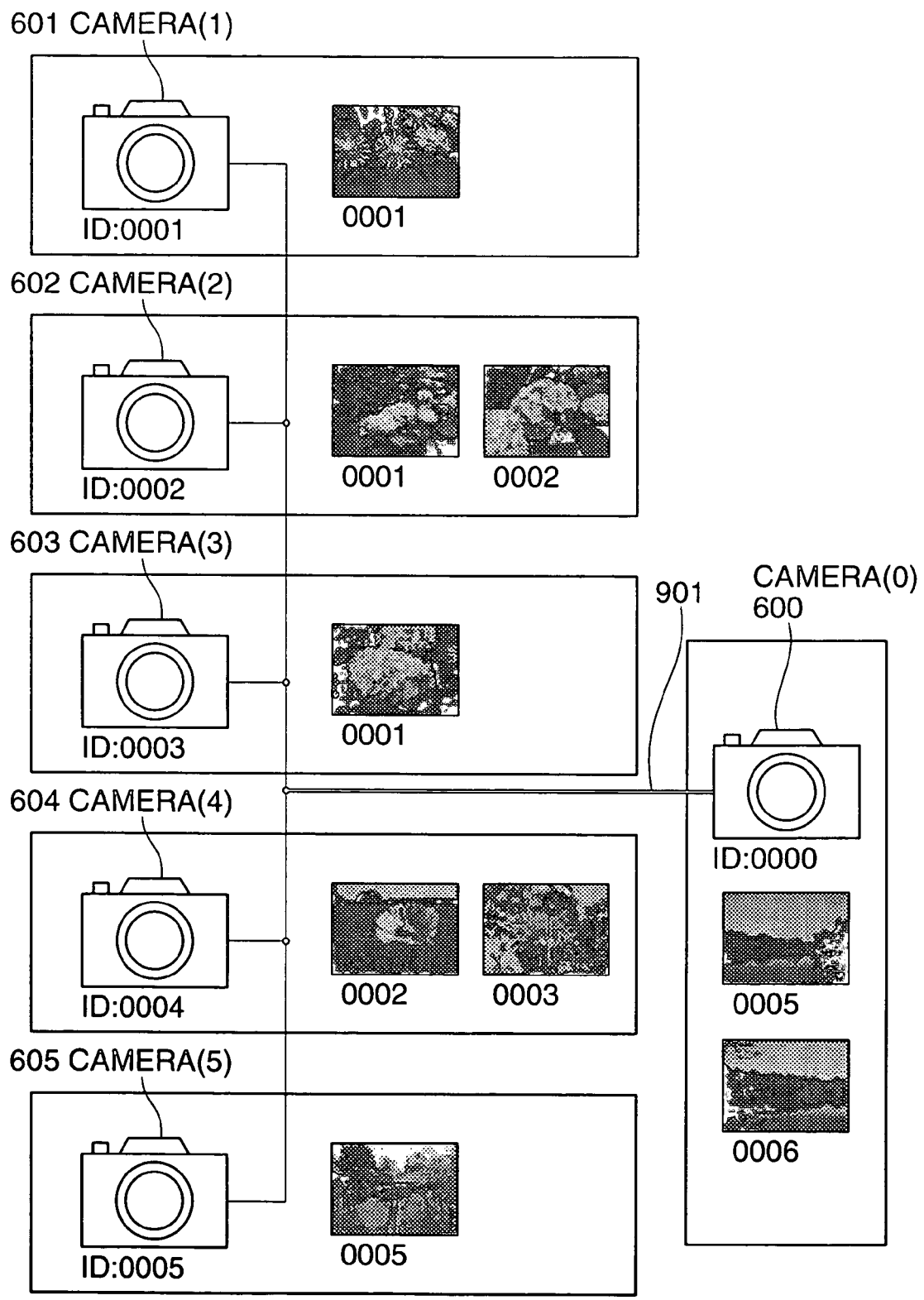
FIG. 9 is a diagram showing an example of the connection between digital cameras.

FIG. 8 is a flowchart showing the procedure of the processing when a copy operation for digital image data of one image is carried out by two of the plurality of digital cameras (1) 601 to (5) 605 shown in FIGS. 6A to 6E.

In FIG. 8, the copying of digital image data of one image between the two digital cameras is performed as follows. A receiver digital camera issues a new image number that is unique to the receiver digital camera (step S801). The receiver digital camera copies the device number ID and the unique image number of a sender digital camera (step S802), and then copies the image data (step S803). After this, the present process is terminated.

Next, the procedure of processing when digital image data of a plurality of images is copied to a digital camera from some of the plurality of digital cameras (1) 601 to (5) 605 will be described with reference to FIGS. 9, 10A and 10B.

FIG. 9 is a diagram showing an example of the connection between the digital cameras (1) 601 to (5) 605 and another digital camera via respective communication connectors 105.

In FIG. 9, reference numeral 600 designates another digital camera (0), and reference numeral 901 designates a connection line that connects the digital cameras together. The other digital camera (0) 600 corresponds to the digital camera 100*a* shown in FIG. 5 and an digital camera according to the present embodiment.

Figure 10A:
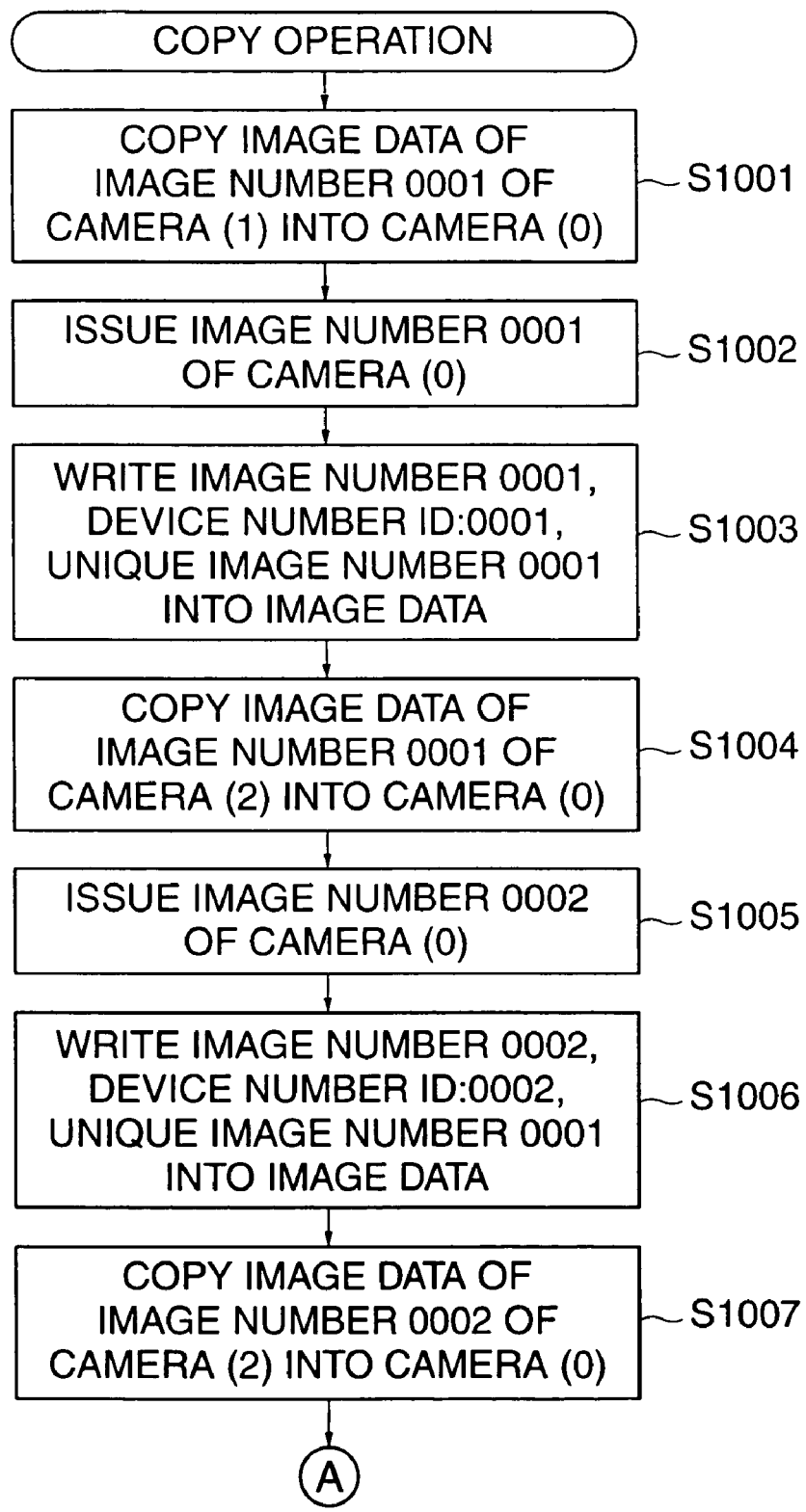
FIGS. 10A and 10B are flowchart showing the procedure of processing when a copy operation is carried out.
Figure 10B:
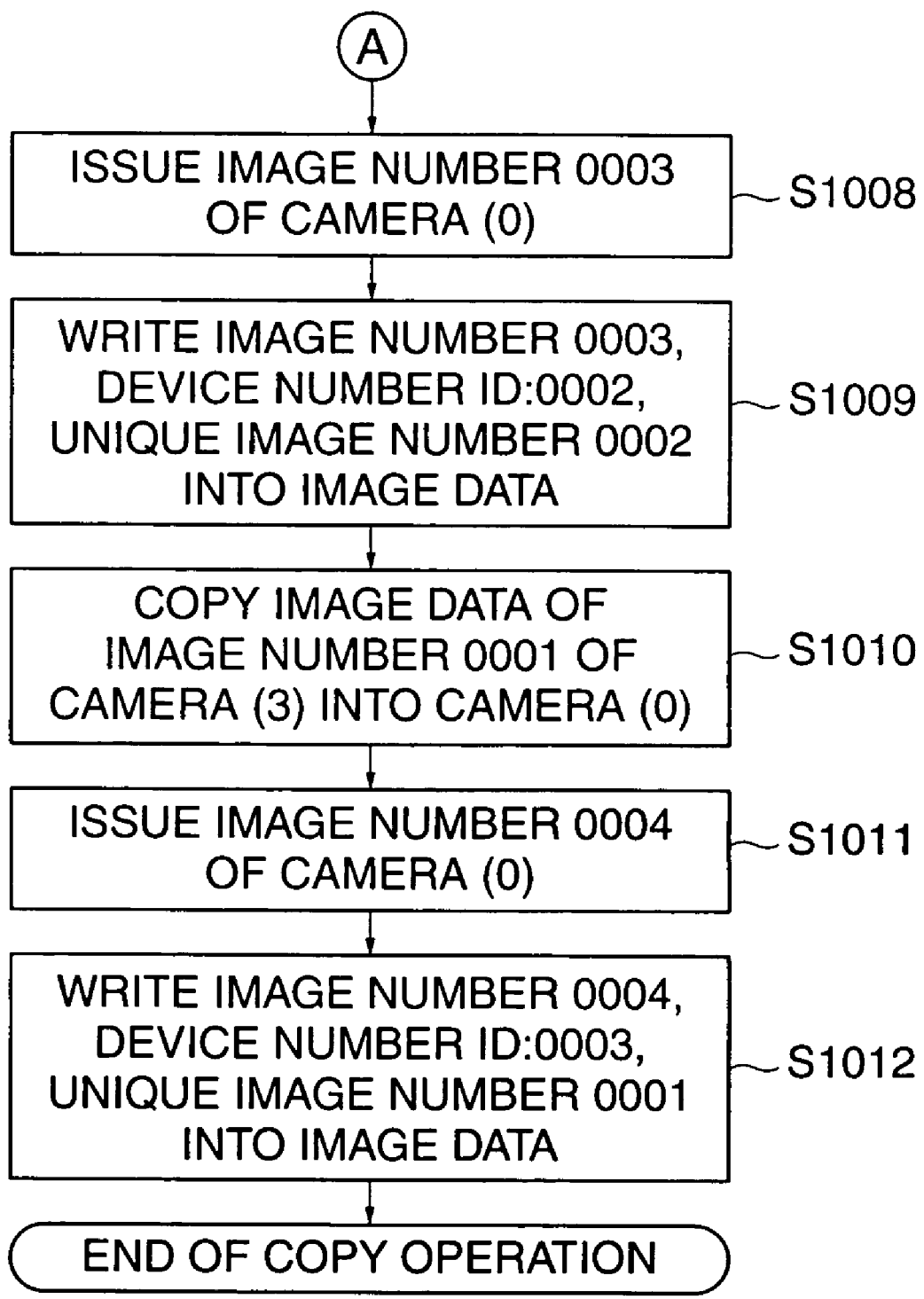

FIGS. 10A and 10B are flowchart showing the procedure of processing when carrying out copy operations for copying from the plurality of digital cameras to the other digital camera (0) 600 shown in FIG. 9.

In carrying out copy operations, digital image data is transferred from the respective digital cameras (1) 601 to (5) 605 shown in FIG. 9 to the other digital camera (0) 600 via the connection line 901.

Figure 13:
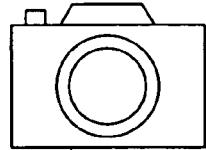
FIG. 13 is a diagram showing digital image data managed by a transfer destination digital camera.

In FIGS. 10A and 10B, digital image data with the image number 0001 that is recorded in the recording medium 109 of the digital camera (1) 601 is copied into the digital camera (0) 600 (step S1001). Next, an image number 0001 that indicates a first image of the digital camera (0) 600 is issued for the digital camera (0) 600 in the same way as described above with reference to FIG. 6 (step S1002), the copied digital image data "image number 0001 of digital camera (1) 601" for a first copied image is managed using the image number 0001, and a device number ID:0001 and a unique image number 0001 are written into the digital image data (step S1003). At this time, the image number newly issued for the image data transferred from the digital camera (1) 601 may be incorporated as part of a filename and for example the image data may be recorded as an image data file as shown in FIG. 13, described later.

Next, digital image data with the image number 0001 that is recorded in the recording medium 109 of the digital camera (2) 602 shown in FIG. 9 is copied into the digital camera (0) 600 (step S1004). Since the digital camera (0) 600 has already issued the image number 0001 that indicates the first image copied by the digital camera (0) 600, an image number 0002 that indicates a second image of the digital camera (0) 600 is issued (step S1005), the copied digital image data "image number 0001 of digital camera (2) 602" for a second copied image is managed as the image number 0002, and a device number ID:0002 and a unique image number 0001 are written into the image data (step S1006).

Next, the digital image data with the image number 0002 that is recorded in the recording medium 109 of the digital camera (2) 602 is copied into the digital camera (0) 600 (step S1007).

Next, in the digital camera (0) 600, an image number 0003 that indicates a third image of the digital camera (0) 600 is issued (step S1008), the copied digital image data "image number 0002 of digital camera (2) 602" for a third copied image is managed as the image number 0003, and a device number ID:0002 and a unique image number 0002 are written into the image data (step S1009).

After this, the digital image data with the image number 0001 that is recorded in the recording medium 109 of the digital camera (3) 603 shown in FIG. 9 is copied into the digital camera (0) 600 (step S1010). In the digital camera (0) 600, the image numbers 0001 to 0003 that indicate the first to third images of the digital camera (0) 600 have already been issued, so an image number 0004 that indicates a fourth image of the digital camera (0) 600 is issued (step S1011), the copied digital image data "image number 0001 of digital camera (3) 603" for a fourth copied image is managed as the image number 0004, and a device number ID:0003 and a unique image number 0001 are written into the image data (step S1012). After this, the present process is terminated.

Next, the procedure of processing when a photographic operation is performed by the digital camera (0) 600 that has been disconnected from the plurality of digital cameras (1) 601 to (5) 605 shown in FIG. 9 will be described with reference to FIGS. 9 to 11.

Figure 11:
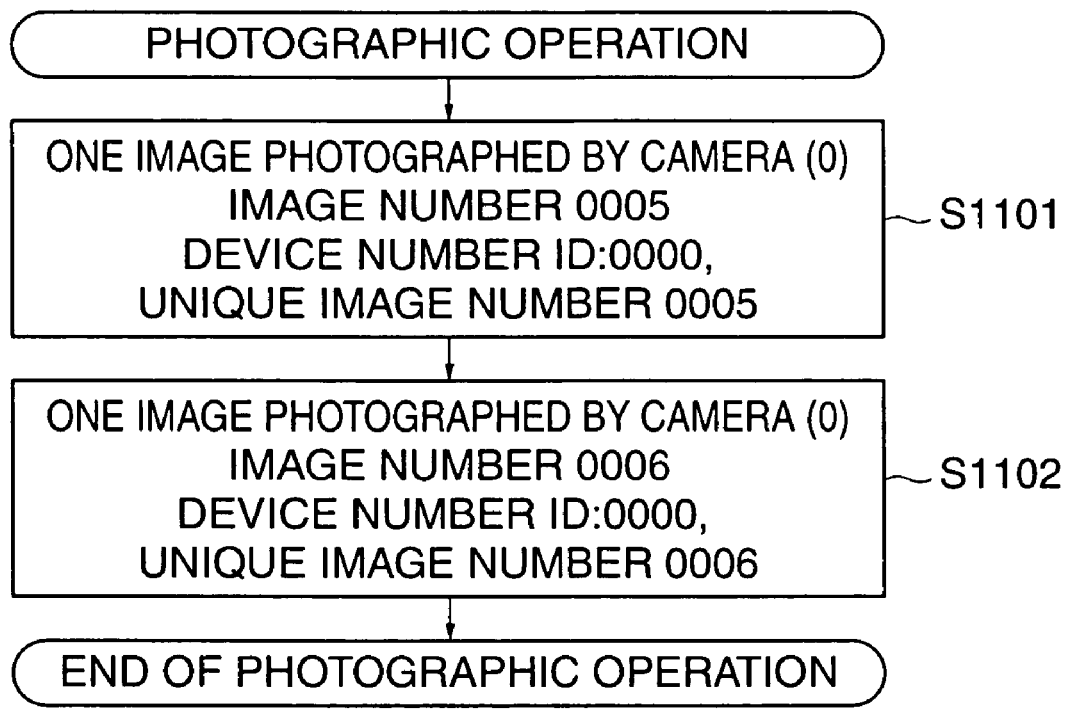
FIG. 11 is a flowchart showing the procedure of processing when a photographic operation is carried out.

FIG. 11 is a flowchart showing the procedure of processing when a photographic operation is performed by the digital camera (0) 600 shown in FIG. 9.

After the execution of the step S1012 in FIG. 10B described above, the digital camera (0) 600 is disconnected from the connection line 901 and two frame photographs are taken by the digital camera (0) 600.

In the digital camera (0) 600, since the image numbers 0001 to 0004 have already been issued, if a photographic operation is performed to take one frame photograph, an image number 0005 that indicates a fifth image of the digital camera (0) 600 is issued, the digital image data of the fifth image is managed as the image number 0005, and a device number ID:0000 and a unique image number 0005 are written into the digital image data (step S1101). Next, if another photographic operation is performed by the digital camera (0) 600 to take one frame photograph, an image number 0006 that indicates a sixth image of the digital camera (0) 600 is issued, the digital image data of the sixth image is managed as the image number 0006, a device number ID:0000 and a unique image number 0006 are written into the digital image data (step S1102), and after this the present process is terminated.

Next, the procedure of processing when a copy operation is carried out by the digital camera (0) 600, after the photographic operations by the digital camera (0) 600 described above with reference to FIG. 11 will be described with reference to FIGS. 9 and 12. Before this copy operation is started, the digital camera (0) 600 is connected to the connection line 901.

Figure 12:
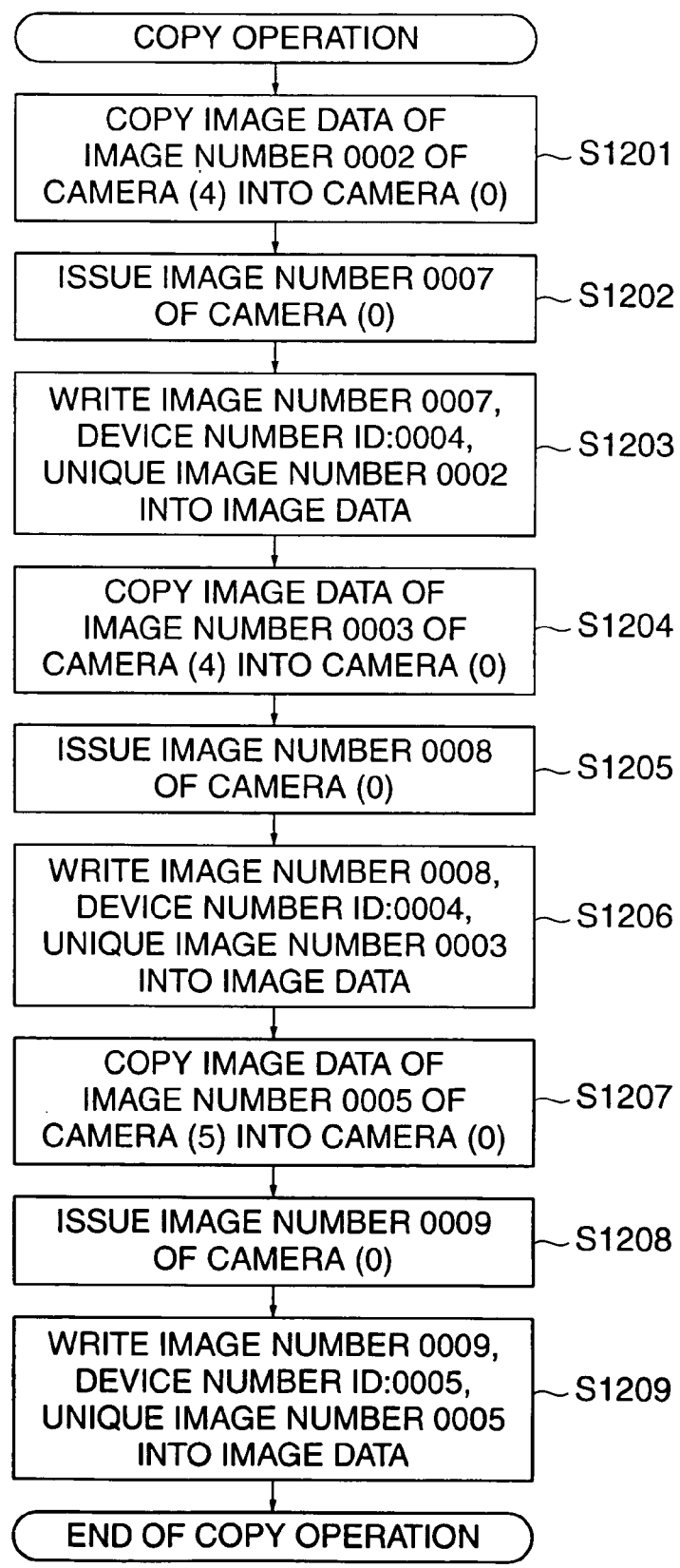
FIG. 12 is a flowchart showing the procedure of processing when a copy operation is carried out.

FIG. 12 is a flowchart showing the procedure of processing when a copy operation is performed by a plurality of digital cameras.

First, the digital image data with the image number 0002 recorded in the recording medium 109 of the digital camera (4) 604 is copied into the digital camera (0) 600 (step S1201). The digital camera (0) 600 has already issued the image numbers 0001 to 0006 that indicate the first to sixth images of the digital camera (0) 600, so that an image number 0007 that indicates a seventh image of the digital camera (0) 600 is issued (step S1202), the digital image data of the copied image "image number 0002 of digital camera (4) 604" for a seventh image is managed as the image number 0007, and a device number ID:0004 and a unique image number 0002 are written into the digital image data (step S1203).

Next, digital image data with the image number 0003 that is recorded in the recording medium 109 of the digital camera (4) 604 is copied into the digital camera (0) 600 (step S1204). An image number 0008 that indicates an eighth image of the digital camera (0) 600 is issued (step S1205), the digital image data of the copied image "image number 0003 of digital camera (4) 604" for an eighth image is managed as the image number 0008, and a device number ID:0004 and a unique image number 0003 are written into the digital image data (step S1206).

After this, digital image data with the image number 0005 that is recorded in the recording medium 109 of the digital camera (5) 605 is copied into the digital camera (0) 600 (step S1207). The digital camera (0) 600 has already issued the image numbers 0001 to 0008, so that an image number 0009 that indicates a ninth image of the digital camera (0) 600 is issued (step S1208). The digital image data of the copied image data is managed as the image number 0009, a device number ID:0005 and a unique image number 0005 are written into the digital image data (step S1209), and after this the present process is terminated.

In this way, the digital cameras (1) 601 to (5) 605 copy pieces of digital image data with the same image numbers into the other digital camera (0) 600, and even when a copy operation is interrupted by a photographic operation by the digital camera (0) 600, copying operations for digital image data and photographic operations can be performed without digital image data obtained by the copying operations and digital data image obtained by the photographic operations being overwritten one upon another.

FIG. 13 is a diagram showing the digital image data managed by the digital camera (0) 600 as a result of the copy operations and photographic operations described above.

When the digital image data recorded in the recording medium 109 of the digital camera (0) 600, that is, the data shown in FIG. 13, is displayed on the display section 107 in order of the image numbers managed by the digital camera (0) 600, the resulting display is as shown in FIG. 3. It should be noted that in FIG. 13 the digital image data that is shaded is data obtained by the photographic operations described above with reference to FIG. 11, and the other digital image data is data obtained by the copy operations described above with reference to FIGS. 10A, 10B and 12.

Next, the procedure of the processing when digital image data is displayed as shown in FIG. 3 by the digital camera (0) 600 will be described with reference to FIGS. 14 and 15.

Figure 14:
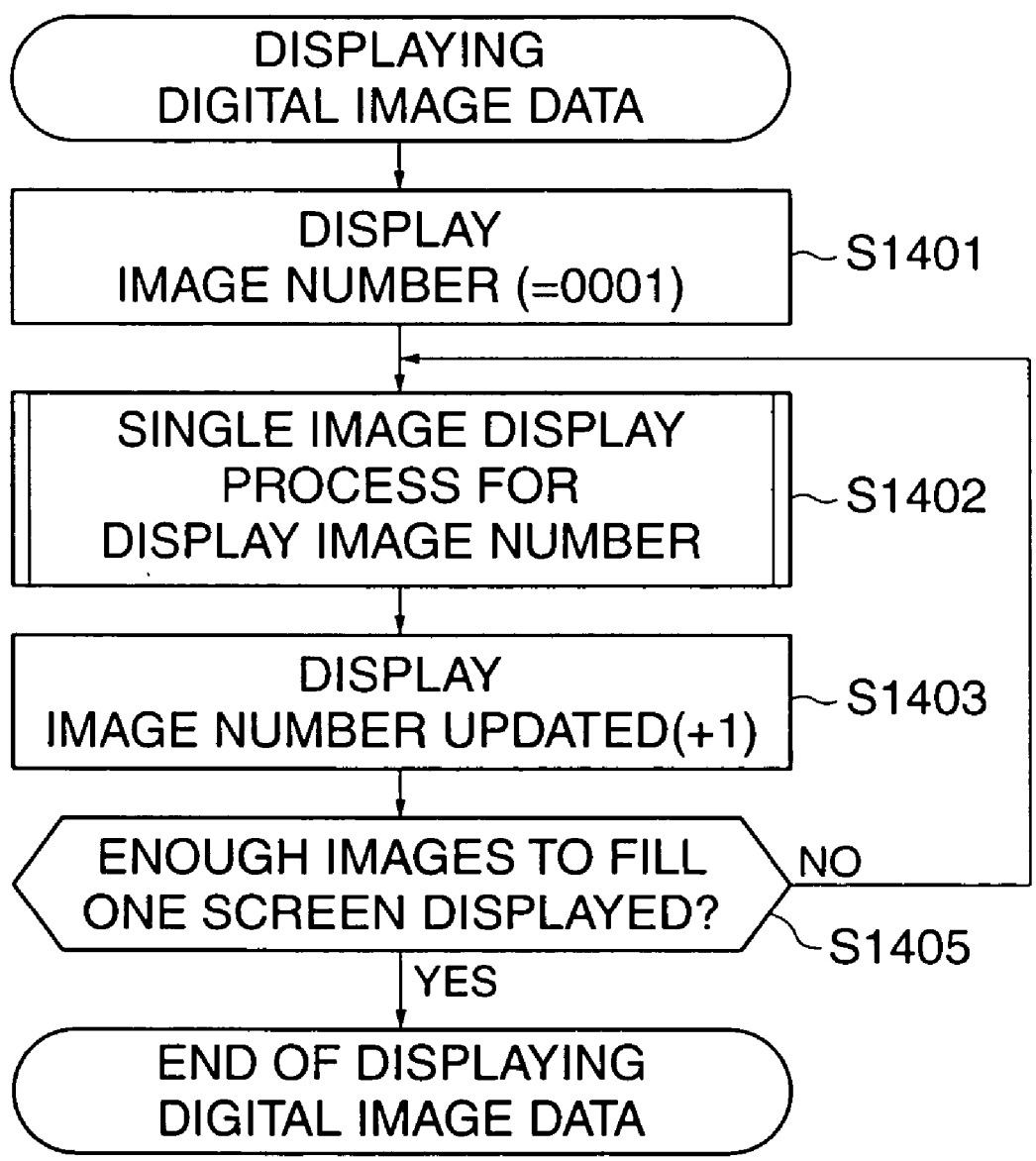
FIG. 14 is a flowchart showing the procedure of processing when digital image data is displayed.
Figure 15:
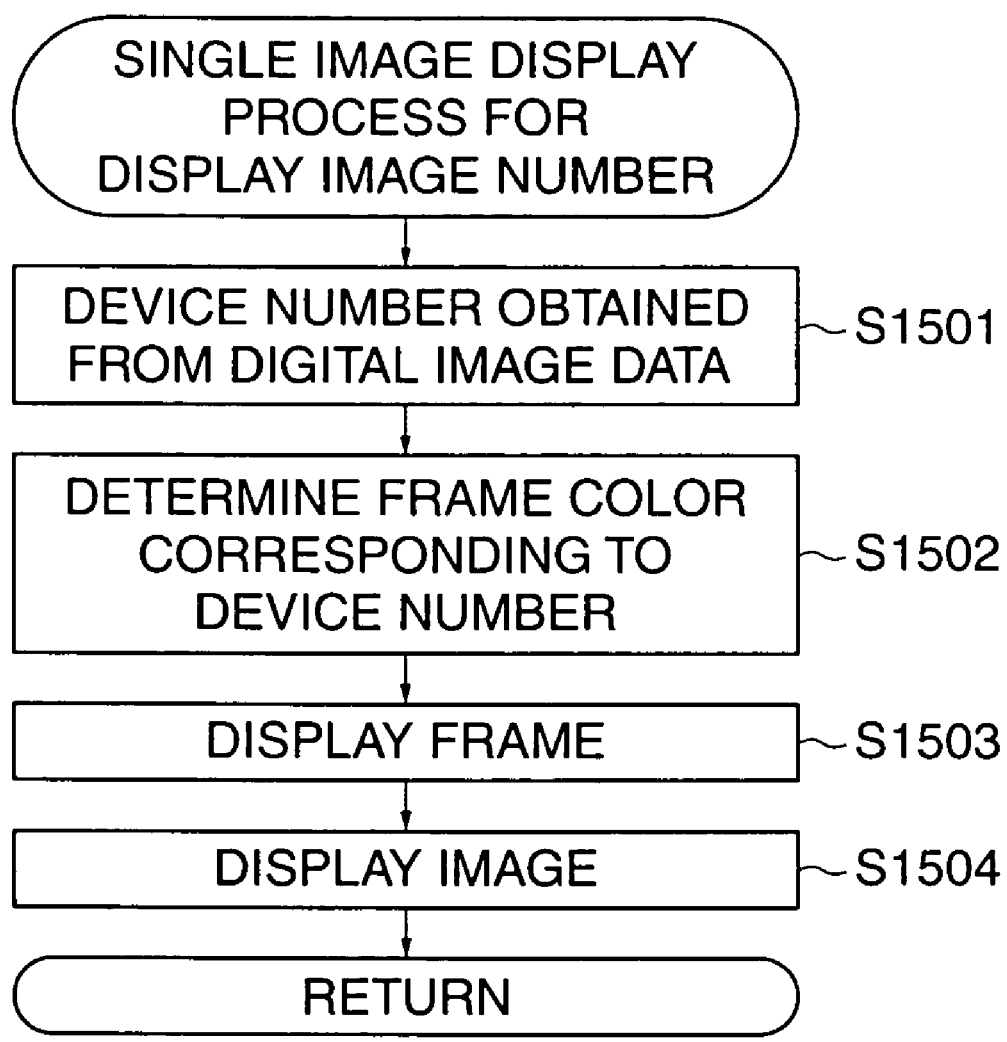
FIG. 15 is a flowchart showing the procedure of processing when one image is displayed according to a display image number.

In FIG. 14, to display digital image data as shown in FIG. 3, the digital camera (0) 600 reads the digital image data to be displayed (first, the digital image date with the image number 0001) from the recording medium 109 (step S1401) and carries out an image display process for a single display image number described later (step S1402). After this, the image number to be displayed is incremented by one (step S1403). When sufficient images to fill one screen have not been displayed, the process returns to the step S1402. When sufficient images to fill one screen have been displayed, the present process is terminated.

Next, the image display process for a single display image number in the step S1402 of FIG. 14 will be described.

The digital camera (0) 600 reads image data in ascending order of image numbers from the recording medium 109 and determines a device number ID recorded in each piece of the read digital image data (step S1501). The digital camera (0) 600 determines a color of a frame corresponding to the device number (step S1502). Then, as shown in FIG. 3, the frame is displayed (step S1503) and the image data is displayed (step S1504), followed by the process being terminated.

As described above, according to the present embodiment, when digital image data photographed by a plurality of digital cameras is copied into one digital camera and the digital image data is then reproduced, it is possible to display the digital image data photographed by the respective digital cameras in such a manner that the respective displayed digital image data can be distinguished with respect to the digital cameras that photographed the displayed digital image data.

Next, a second embodiment of the present invention will be described with reference to FIGS. 16 to 20. An image pickup apparatus according to the second embodiment is identical in basic construction with the image pickup apparatus according to the first embodiment described above, and description thereof is, therefore, omitted.

Figure 16:
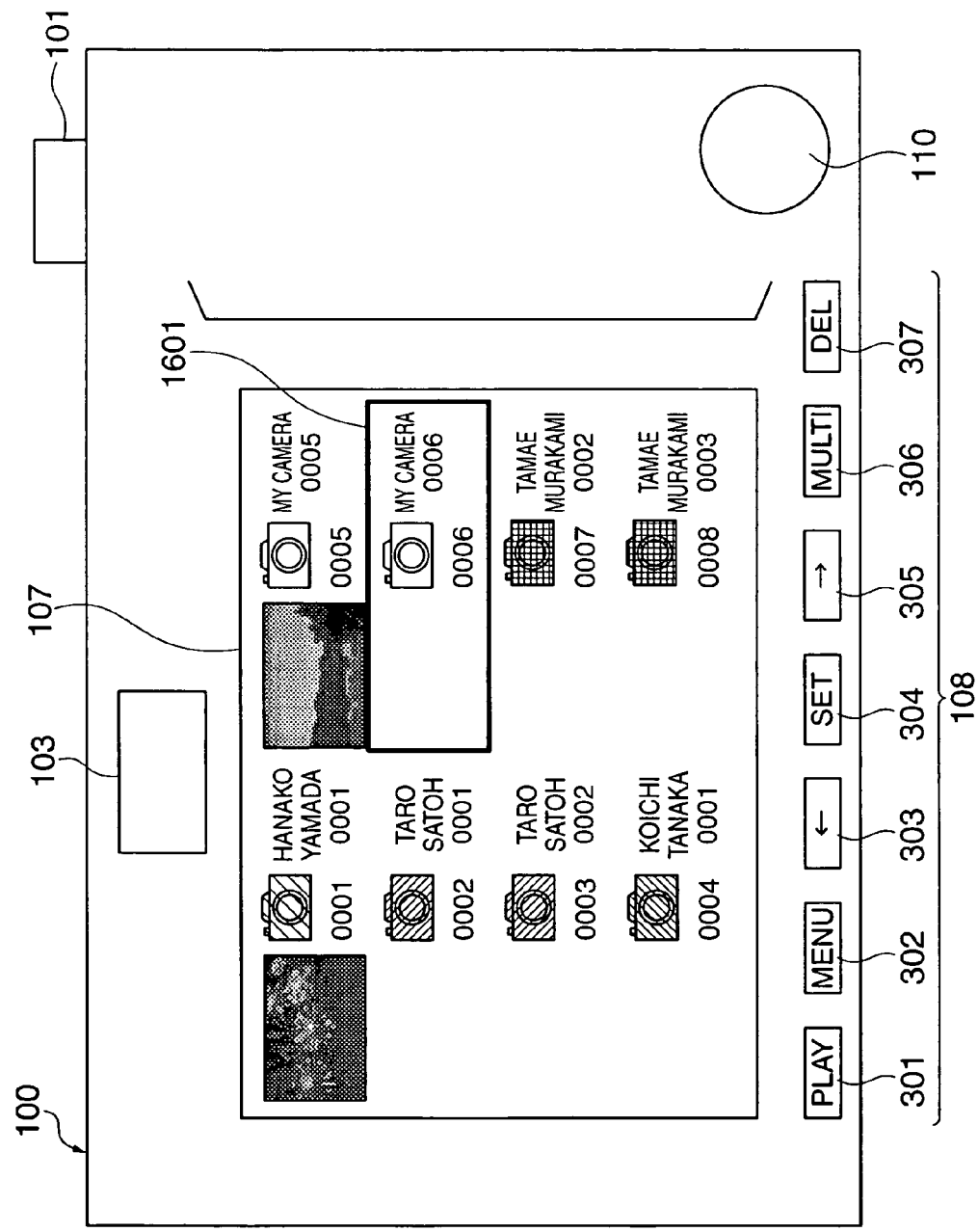
FIG. 16 is a view showing an example of display of digital image data by an image pickup apparatus according to a second embodiment of the present invention.

FIG. 16 is a diagram showing an example of display of digital image data by a digital camera as an image pickup apparatus according to the second embodiment. In FIG. 16, component elements that correspond to those of the first embodiment described above are designated by identical reference numerals.

In FIG. 16, reference numeral 1601 designates digital image data that is selected for display on an enlarged scale.

Figure 17:
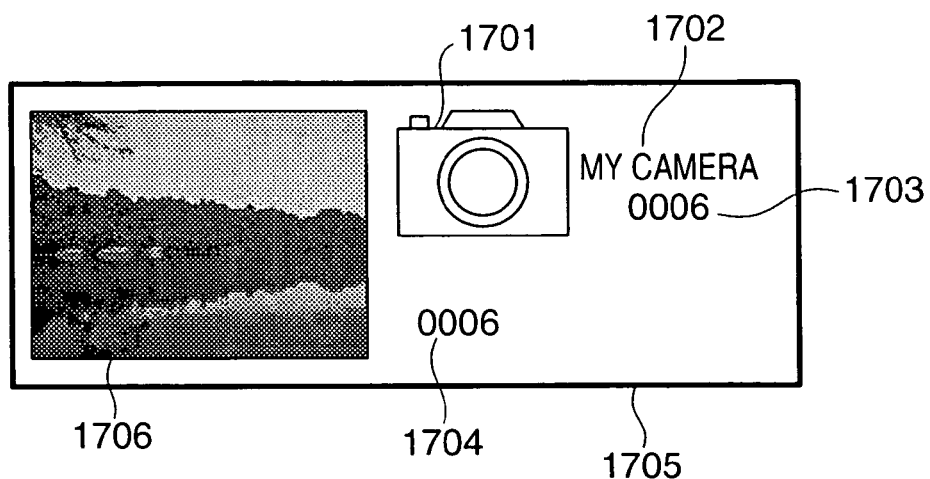
FIG. 17 is a an view showing on an enlarged scale an image of the digital image data displayed in FIG. 16.

FIG. 17 is an enlarged view of one piece of digital image data 1601 in the digital image data displayed on the display section 107 of FIG. 16. In FIG. 17, the display of the digital image data 1601 is comprised of a color icon 1701 for identifying a present digital camera, a digital camera user name 1702, a unique image number 1703 that is unique for the digital camera shown by the icon 1701, an image number 1704 used for identifying the image within the present digital camera, and a frame 1705. In FIG. 17, reference numeral 1706 designates the digital image data.

In FIG. 16, icons are displayed in colors shown in Table 1 below, and respective pieces of digital image data can be displayed with identification information.

TABLE 1

| Image Number | Device Number | User Name | Unique Image Numbers | Icon Color |
| --- | --- | --- | --- | --- |
| 0001 | ID: 0001 | Hanako Yamada | 0001 | Sky Blue |
| 0002 | ID: 0002 | Taro Satoh | 0001 | Green |
| 0003 | ID: 0003 | Taro Satoh | 0002 | Green |
| 0004 | ID: 0004 | Koichi Yamada | 0001 | Purple |
| 0005 | ID: 0005 | My Camera | 0005 | Yellow |
| 0006 | ID: 0006 | My Camera | 0006 | Yellow |
| 0007 | ID: 0007 | Tamae Murakami | 0002 | Blue |
| 0008 | ID: 0008 | Tamae Murakami | 0003 | Blue |

In the image display state shown in FIG. 16, it is possible to select image data using the first operating button 303 and/or the third operating button 305 so that only digital image data photographed by the same digital camera as the selected image data, that is, digital image data that has the same device number, can be selectively displayed.

Figure 18:
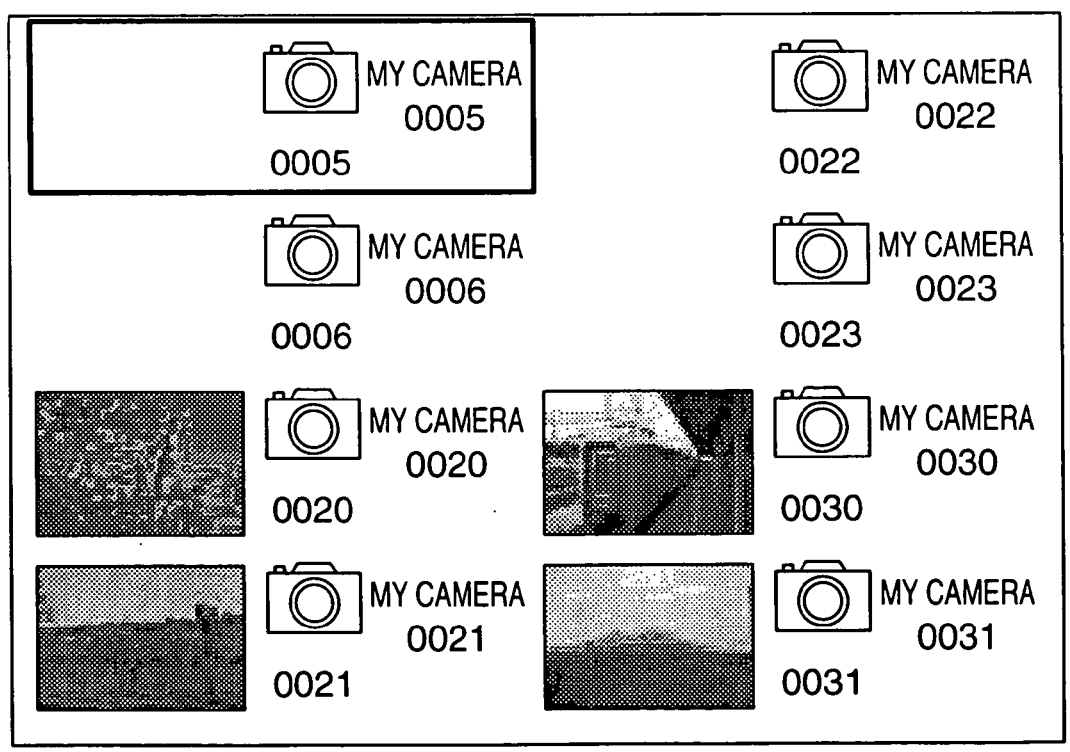
FIG. 18 is a diagram showing a state where an icon "My Camera" has been selected from the image display state in FIG. 16 so that only icons of all the digital image data photographed by the user of the present digital camera and currently stored in the recording medium 109 are displayed.

FIG. 18 is a diagram showing a state where an icon "My Camera" (with the device number ID:0005) has been selected from the image display state in FIG. 16 so that only icons of all the digital image data photographed by the user of the present digital camera and currently stored in the recording medium 109 (each given a name "My Camera") are displayed.

Figures 19, 20:
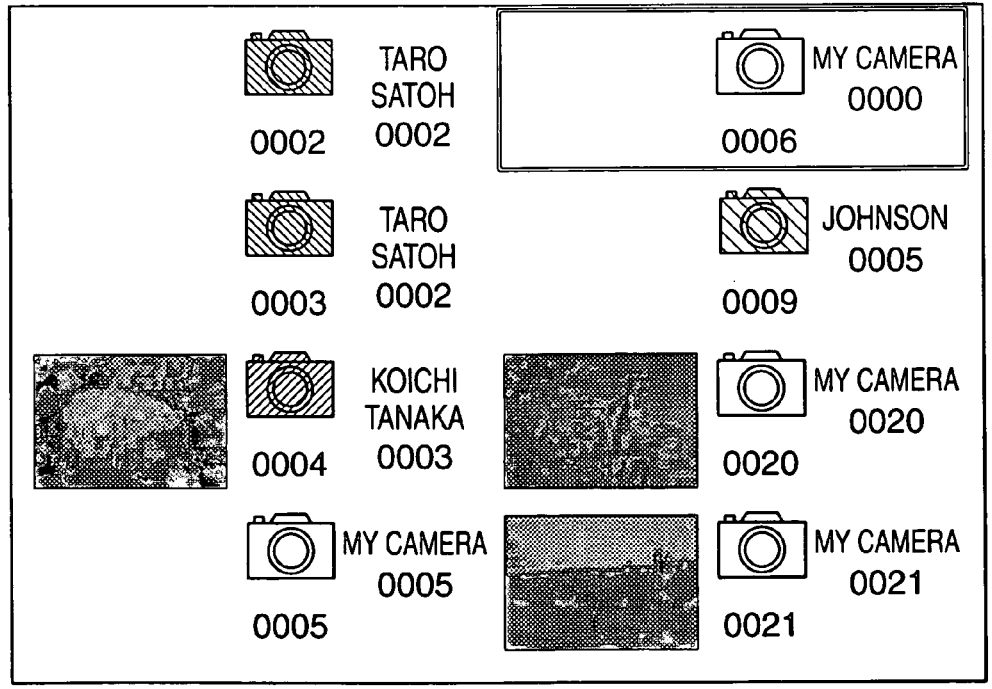
FIG. 19 is a diagram showing a state where a list of device numbers and user names of digital image data recorded in the recording medium 109 is displayed on the display section 107.
FIG. 20 is a diagram showing a state where icons of only digital image data photographed by digital cameras for which the display valid state checkbox 1901 is selected in the screen shown in FIG. 19.

FIG. 19 is a diagram showing a state where a list of device numbers and user names of digital image data recorded in the recording medium 109 is displayed on the display section 107.

In the screen shown in FIG. 19, either a display valid state checkbox 1901 or a display invalid state checkbox 1902 can be selected for digital image data photographed by respective digital cameras. By selecting the checkboxes, it is possible to have only digital image data photographed by digital cameras set at "display valid" displayed.

A list of user names and icon colors that are used in the screen shown in FIG. 19 and correspond to the device numbers is shown in Table 2 below.

TABLE 2

| Device Number | User Name | Icon Color |
| --- | --- | --- |
| ID: 0000 | My Camera | Yellow |
| ID: 0001 | Hanako Yamada | Sky Blue |
| ID: 0002 | Taro Satoh | Green |
| ID: 0003 | Koichi Yamada | Purple |
| ID: 0004 | Tamae Murakami | Blue |
| ID: 0005 | David Johnson | Orange |

FIG. 20 is a diagram showing a state where icons of only digital image data photographed by digital cameras for which the display valid state checkbox 1901 is selected in the screen shown in FIG. 19, that is, digital cameras set at "display valid", are displayed.

In FIG. 20, icons of only the digital image data photographed by "My Camera" (device number ID:0000), "Koichi Tanaka" (device number ID:0003), and "David Johnson" (device number ID:0005) are displayed. It should be noted that in the screen of FIG. 20, only part of the icons of digital image data named "My Camera" of the user of the present digital camera are displayed for the convenience of illustration.

In this way, it is possible to distinguish between display images using the device numbers and/or user names of digital cameras and to selectively display images, so that digital image data photographed by a plurality of digital cameras can be sorted and displayed. Such selected image data can also be used when batch copying or deleting multiple images, transferring image data to a communication line, designating images for printing, and the like.

According to the above embodiments, when image data photographed by a plurality of digital cameras is transferred between cameras and is displayed together by a single image pickup apparatus, it is possible to easily display images from different cameras differently.

At this time, when the same number has been allotted to copied sets of digital image data, at least one of photographed times, data sizes and image data contents of the sets of image data may be compared with one another.

Although an example where an image pickup apparatus is implemented by a digital camera is described in the above embodiments, it should be obvious that the present invention is not limited to digital cameras and may be applied to other digital image recording apparatuses, such as digital video cameras.

It goes without saying that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a RAM, an NV-RAM, a floppy (registered trademark) disk, a hard disk, a magnetic-optical disk, a CD-ROM, a CD-R, a CD-RW, a DVD (a DVD-ROM, a DVD-RAM, a DVD–RW, or a DVD+RW), a magnetic tape, a nonvolatile memory card, and a ROM. Alternatively, the program may be supplied by downloading from another computer, a database, or the like, not shown, connected to the Internet, a commercial network, a local area network, or the like.

What is claimed is:

1. An image pickup apparatus comprising:
    an image pickup unit;
    a recording unit that records on the recording medium image data photographed by said image pickup unit;
    a display unit that displays the image data recorded on the recording medium;
    an assigning unit that assigns to the image data, unique apparatus information for identifying said image pickup apparatus and image identifying information for managing in said image pickup apparatus the image data recorded on the recording medium;
    a communication unit that is connectable to another image pickup apparatus, for transmitting the image data recorded on the recording medium to said another image pickup apparatus and receiving image data from said another image pickup apparatus;
    a modifying unit that modifies image identifying information added on the image data received from said another image pickup apparatus by said communication unit and generates modified image identifying information for managing the received image data in said image pickup apparatus; and
    a control unit that manages the image data recorded on the recording medium by said recording unit and the image data received from said another image pickup apparatus by said communication unit according to the unique apparatus information, the image identifying information and the modified image identifying information,
    wherein said control unit controls said display unit to display the image data recorded by said recording unit and the image data received by said communication unit from said another image pickup apparatus in different display configuration, respectively, in such a manner that the image data received by said communication unit from the image pickup apparatus and the image data recorded by said recording unit can be distinguished from one another.

2. An image pickup apparatus according to claim 1, wherein said control provides control to cause said display unit to display the image data received by said communication unit from said another image pickup apparatus and the image data recorded by said recording unit, with frames of respective different colors added thereto.

3. An image pickup apparatus according to claim 1, wherein said control unit provides control to cause said display unit to display the image data received by said communication unit from said another image pickup apparatus and the image data recorded by said recording unit, with icons different from each other added thereto.

4. An image pickup apparatus according to claim 1, wherein said assigning unit assigns an image number for identifying image data to each of the photographed image data.

5. An image pickup apparatus according to claim 4, wherein said control unit is operable when image data is received by said communication unit after the image number has been assigned to the photographed image data by said assigning unit, to provide control to cause said assigning unit to assign an image number different from the image number assigned to the photographed image data to the received image data and then record the received image data on the recording medium.

6. An image pickup apparatus according to claim 4, wherein said control unit is operable when a photographic operation is carried out to produce image data after the image number has been assigned to the image data received by said communication device by said assigning unit, to provide control to cause said assigning unit to assign an image number different from the image number assigned to the image data recorded by said recording unit to the image data produced by the photographic operation and then record the photographed image data in said recording unit.

7. An image pickup apparatus according to claim 4, wherein said control unit provides control such that a new image number assigned to the received image data by said assigning unit is incorporated as part of a file name of the received image data and the received image data is recorded in said recording unit.

8. An image pickup apparatus according to claim 4, wherein said control unit is operable when a same image number has been assigned to the received image data and the recorded image data, to provide control to compare at least one of respective photographed times, data sizes, and image data contents of the received image data and the recorded image data.

9. A method of causing an image pickup apparatus to display image data, the image pickup apparatus including an image pickup unit, a recording unit that records on the recording medium image data photographed by said image pickup unit, a display unit that displays the image data recorded on the recording medium, a communication unit that is connectable to another image pickup apparatus, for transmitting the image data recorded on the recording medium to said another image pickup apparatus and receiving the image data from said another image pickup apparatus the method comprising:
    an assigning step of assigning to the image data, unique apparatus information for identifying said image pickup apparatus and image identifying information for managing in said image pickup apparatus the image data recorded on the recording medium;
    a modifying step of modifying an image identifying information added on the image data received from said another image pickup apparatus by said communication unit and generating modified image identifying information for managing the received image data in said image pickup apparatus; and a control step of managing the image data recorded on the recording medium by said recording unit and the image data received from said another image pickup apparatus by the communication unit according to the unique apparatus information, the image identifying information and the modified image identifying information, wherein said control step controls said display unit to display the image data recorded by said recording unit and the image data received by said communication unit from said another image pickup apparatus in different display configuration, respectively, in such a manner that the image data received by the communication unit from the image pickup apparatus and the image data recorded by the recording unit can be distinguished from one another.

10. A method of displaying image data according to claim 9, wherein said control step provides control to cause the display unit to display the image data received by the communication unit from said another image pickup apparatus and the image data recorded by the recording unit, with frames of respective different colors added thereto.

11. A method of displaying image data according to claim 9, wherein said control step provides control to cause the display unit to display the image data received by the communication unit from said another image pickup apparatus and the image data recorded by the recording unit, with icons different from each other added thereto.

12. A method of displaying image data according to claim 9, wherein said assigning steps assigns an image number for identifying image data to each of photographed image data.

13. A method of displaying image data according to claim 12, wherein when image data is received by said communication unit after the image number has been assigned to the photographed image data in said assigning step, said control step provides control to cause said modifying step to assign an image number different from the image number assigned to the photographed image data to the received image data and then record the received image data on the recording medium.

14. A method of displaying image data according to claim 12, wherein when a photographic operation is carried out to produce image data after the image number has been assigned to the image data received by said communication unit in said assigning step, said control step causes said modifying step to assign an image number different from the image number assigned to the image data recorded by said recording unit to the image data produced by the photographic operation and then record the photographed image data in the recording unit.

15. A method of displaying image data according to claim 12, wherein said control step provides control such that a new image number assigned to the received image data in said modifying step is incorporated as part of a file name of the received image data and the received image data is recorded in said recording unit.

16. A computer-readable control program stored on a computer-readable storage medium for causing a computer to implement a method of causing an image pickup apparatus to display image data, the image pickup apparatus including an image pickup unit, a recording unit that records on the recording medium image data photographed by said image pickup unit, a display unit that displays the image data recorded on the recording medium, a communication unit that is connectable to another image pickup apparatus, for transmitting the image data recorded on the recording medium to said another image pickup apparatus and receiving image data from said another image pickup apparatus, the method comprising:

an assigning module for assigning to the image data, unique apparatus information for identifying said image pickup apparatus and image identifying information for managing in said image pickup apparatus the image data recorded on the recording medium, a modifying module for modifying image identifying information added on the image data received from said another image pickup apparatus by said communication unit and generates modified image identifying information for managing the received image data in said image pickup apparatus; and a control module for managing the image data recorded on the recording medium by said recording unit and the image data received from said another image pickup apparatus by said communication unit according to the unique apparatus information, the image identifying information and the modified image identifying information, wherein said control module controls said display unit to display the image data recorded by said recording unit and the image data received by said communication unit from said another image pickup apparatus in different display configuration, respectively, in such a manner that the image data received by said communication unit from the image pickup apparatus and the image data recorded by the recording unit can be distinguished from one another.

17. A method of displaying image data according to claim 12, wherein said control step is operable when a same image number has been assigned to the received image data and the recorded image data, to provide control to compare at least one of respective photographed times, data sizes, and image data contents of the received image data and the recorded image data.

* * * * *